(12) United States Patent
Volpi et al.

(10) Patent No.: US 9,646,182 B2
(45) Date of Patent: May 9, 2017

(54) INTERROGATOR AND INTERROGATION SYSTEM EMPLOYING THE SAME

(71) Applicant: Veroscan, Inc., Addison, TX (US)

(72) Inventors: John P. Volpi, Garland, TX (US); Jimmy D. Laferney, Frisco, TX (US); William C. Montgomery, Rockwall, TX (US)

(73) Assignee: Medical I.P. Holdings LP, Addison, TX (US)

( * ) Notice: Subject to any disclaimer, the term of this patent is extended or adjusted under 35 U.S.C. 154(b) by 0 days.

(21) Appl. No.: 14/047,254

(22) Filed: Oct. 7, 2013

(65) Prior Publication Data

US 2014/0028444 A1    Jan. 30, 2014

Related U.S. Application Data

(63) Continuation of application No. 11/799,727, filed on May 2, 2007, now Pat. No. 8,552,869, which is a
(Continued)

(51) Int. Cl.
*G08B 13/24* (2006.01)
*G06K 7/10* (2006.01)
(Continued)

(52) U.S. Cl.
CPC ....... *G06K 7/10019* (2013.01); *G06K 7/0008* (2013.01); *G06K 7/10336* (2013.01); *G06K 17/00* (2013.01); *G06Q 10/08* (2013.01); *G06Q 10/087* (2013.01); *G08B 13/24* (2013.01); *G06K 2017/0045* (2013.01)

(58) Field of Classification Search
CPC .... G08B 26/003; G08B 26/00; G08B 26/002; G08B 26/004; G08B 26/007; G08B 29/20; G08B 13/24; G08B 13/2405; G08B 13/2028; G08B 13/2451; G08B 13/2454; G08B 13/2462; G06K 2017/0045; G06K 7/10336; G06K 7/10019; G06K 7/10029; G06K 7/10039; G06K 7/10316; G06K 7/10326; G01S 5/00; G01S 5/0009; G01S 5/16; G01S 5/18

USPC ....... 340/572.1, 572.4, 572.7, 539.1, 539.11, 340/539.13, 505, 520, 521, 10.1, 10.4; 235/382, 382.5; 700/215, 226, 229; 713/182, 185

See application file for complete search history.

(56) References Cited

U.S. PATENT DOCUMENTS 4,363,020 A * 12/1982 Venema .................. 340/447
6,008,727 A * 12/1999 Want et al. ............ 340/572.1
(Continued)

*Primary Examiner* — Van Trieu
(74) *Attorney, Agent, or Firm* — Boisbrun Hofman, PLLC

(57) ABSTRACT

The present invention is directed to an interrogator, method of discerning metal and radio frequency identification (RFID) objects, and an interrogation system employing the same. In one embodiment, the interrogator includes a metal sensing subsystem configured to provide a first signal having a signature representing a presence of a metal object, and a RFID sensing subsystem configured to provide a second signal having a signature representing a presence of a RFID object. The interrogator also includes a control and processing subsystem configured to discern a presence of at least one of the metal and RFID objects from one of the first and second signals.

22 Claims, 11 Drawing Sheets

Related U.S. Application Data continuation of application No. 11/357,225, filed on Feb. 17, 2006, now Pat. No. 7,760,097, which is a continuation of application No. 10/378,043, filed on Mar. 3, 2003, now Pat. No. 7,019,650.

(51) Int. Cl.
*G06K 7/00* (2006.01)
*G06K 17/00* (2006.01)
*G06Q 10/08* (2012.01)

(56) References Cited

U.S. PATENT DOCUMENTS

| | | | |
|---|---|---|---|
| 6,342,830 B1* | 1/2002 | Want et al. | 340/10.1 |
| 6,342,844 B1* | 1/2002 | Rozin | 340/933 |
| 6,446,208 B1* | 9/2002 | Gujar et al. | 713/185 |
| 6,600,418 B2* | 7/2003 | Francis et al. | 340/572.1 |
| 6,799,721 B2* | 10/2004 | Parrault | 235/383 |
| 6,970,092 B2* | 11/2005 | Hum et al. | 340/573.4 |
| 7,100,052 B2* | 8/2006 | Ghazarian | 713/182 |
| 7,138,915 B2* | 11/2006 | Morito et al. | 340/572.1 |
| 7,161,470 B2* | 1/2007 | Berquist et al. | 340/10.31 |
| 7,256,695 B2* | 8/2007 | Hamel et al. | 340/572.1 |
| 2004/0212515 A1* | 10/2004 | Eaton | H04B 1/3838 340/870.07 |
| 2006/0092274 A1* | 5/2006 | Good | H04N 7/18 348/61 |
| 2007/0096891 A1* | 5/2007 | Sheriff | B60N 2/002 340/457.1 |

* cited by examiner

INTERROGATOR AND INTERROGATION SYSTEM EMPLOYING THE SAME

This application is a continuation of patent application Ser. No. 11/799,727, entitled "Interrogator and Interrogation System Employing the Same," filed on May 2, 2007 now U.S. Pat. No. 8,552,869, which is a continuation of patent application Ser. No. 11/357,225, entitled "Interrogator and Interrogation System Employing the Same," filed on Feb. 17, 2006, now U.S. Pat. No. 7,760,097, issued Jul. 20, 2010, which is a continuation of patent application Ser. No. 10/378,043, entitled "Interrogator and Interrogation System Employing the Same," filed on Mar. 3, 2003, now U.S. Pat. No. 7,019,650, issued Mar. 28, 2006, which applications and patent are incorporated herein by reference.

TECHNICAL FIELD OF THE INVENTION

The present invention is directed, in general, to communication systems and, more specifically, to an interrogator, method of discerning metal and radio frequency identification (RFID) objects, and an interrogation system employing the same.

BACKGROUND OF THE INVENTION

Asset tracking for the purposes of inventory control or the like is employed in a multitude of industry sectors such as in the food industry, apparel markets and any number of manufacturing sectors, to name a few. In many instances, a bar coded tag or radio frequency identification (RFID) tag is affixed to the asset and a reader interrogates the item to read the tag and ultimately to account for the asset being tracked. Although not readily adopted, an analogous system may be employed in a medical environment to track equipment such as an Electrocardiogram (EKG) machine or other modular patient monitoring equipment.

Of particular note is a surgical environment in which for preparation of surgery a previously sterilized instrument kit of surgical instruments and disposable items (collectively referred to as surgical items) is brought into a surgical suite. The instrument kit contains an assortment of surgical items including hemostats, clamps, forceps, scissors, sponges, and the like, based on the type of surgery to be performed. Typically, a scrub nurse removes the surgical items from the kit and arranges them on a back table located behind the operating table. The surgical items are organized in rows on rolled toweling for ease of access and handling by a surgeon and supporting team. During the course of a surgical procedure, the surgical items are often positioned on a "Mayo" stand proximate the operating table, while the unused surgical items remain on the back table. During the course of and at the conclusion of the surgery, all of the surgical items must be carefully counted to, among other things, avoid leaving any surgical items in a patient.

In view of the consequences, surgical items are typically counted at least three times during the course of a surgical procedure. The first count is performed prior to the start of the procedure; the second count is performed prior to a closure of the patient; the third count is performed at the conclusion of the procedure. In many instances such as when more than one surgical team is assigned to a procedure, many more counts of the surgical items, often involving different personnel (e.g., a circulating nurse and a scrub nurse), are performed. As a matter of fact, the Association of PeriOperative Registered Nurses (AORN) advocates four counts of the surgical items as part of its recommended practices for surgical procedures. Additionally, to keep track of the counts of the surgical items, rudimentary systems such as visual records scribbled on whiteboards or other more progressive computer tallying systems to designate the count of the surgical items are often employed.

In common practice, access to and from an operating room in the surgical suite is restricted during the counting process thereby resulting in a detention of valuable professional personnel. A discrepancy in the count must be resolved by additional counts, physical examination of the patient or x-ray examination, if necessary. Although it is unusual for a discrepancy in the count to result from a surgical item remaining in the patient, counting and recounting occurs in every surgical procedure and the repercussions associated with the loss of a surgical item is of grave concern to a medical facility and the medical professionals.

Thus, the multiple manual counting of surgical items is time consuming, ties up key professional personnel, contributes to surgical suite down time, distracts personnel from the surgical procedure, lengthens the time the patient is exposed to anesthesia leading to an increase in mortality and morbidity risk, is generally distasteful to all involved, and still results in errors wherein materials are left in the patient. It should be quite understandable that the average cost overruns of such delays associated with the personnel, capital equipment and the surgical suite itself can run into the tens of thousands of dollars per procedure. On an annual basis, the loss of productivity associated with the surgical suite is quite sizeable and should be addressed to bolster the bottom line of a medical facility.

Even with the degree of caution cited above, the problem associated with the loss of surgical items, especially surgical items retained within patients, is a serious one and has a significant influence on the costs of malpractice insurance. As a matter of fact, retained foreign bodies within a patient is one of the most prevalent categories of malpractice claims and the most common retained foreign body is a sponge. In accordance therewith, there is a diagnosis known as "gossypiboma" (wherein gossypium is Latin for cotton and boma is Swahili for place of concealment) for the retention of a sponge-like foreign body in a patient. The medical literature is scattered with reports of presentations of retained sponges found days, months, or even years after a surgical procedure.

The sponge is typically made of gauze-like material with dimensions often covering a four-inch square or a two-inch by four-inch rectangle. At one time sponges were commonly made of cotton, but now a number of filament materials are used. Occasionally, a filament of radiopaque material [e.g., barium sulfate ($BaSO_4$)] is woven into the surgical sponge. The filament is provided to produce a distinct signature on an x-ray machine for the purpose of determining if a sponge is present in the patient. While this is generally effective, even these filaments are not 100% effective in aiding the location of the sponges. Different researchers report that x-ray methods to supplement manual counting are fallible.

Moreover, in cases when a sponge remains in the body for a long time, the radiopaque filament can become difficult to locate and may even conform to internal structures. Some have suggested that a computerized tomography (CT) scan can be more effective than an x-ray examination because the CT scans and ultrasonography may detect the reduced density of a sponge and its characteristic pattern of air bubbles trapped within the sponge. Many radiologists have published a number of papers over the years on the problem of finding lost sponges and these are generally known in the field of medicine.

As mentioned above, there is a widespread practice in other fields for counting, tracking and accounting for items and two of the more prevalent and lowest cost approaches involve various types of bar coding and RFID techniques. As with bar coding, the RFID techniques are primarily used for automatic data capture and, to date, the technologies are generally not compatible with the counting of surgical items. A reason for the incompatibility in the medical environment for the bar coding and RFID techniques is a prerequisite to identify items covered in fluids or waste, and the exigencies associated with the sterilization of surgical items including a readable tag.

Outside of the surgical suite, the medical community is not unfamiliar with various forms of automatic identification, counting, and accounting systems and methods. For example, U.S. Pat. No. 4,164,320, entitled "Patient and Specimen Identification Means and System Employing Same," to Irazoqui, et al., describes a magnetic encoding technique for positive identification of patients and specimens associated with a particular patient. For the most part, Irazoqui, et al. and other references primarily use machine-readable technologies such as bar coding and magnetic stripes. The medical community in general recognizes that automatic identification, counting, and accounting systems may reduce errors, improve inventory control and automate record keeping.

For surgical suites and for the purposes of counting surgical items, the medical community has rejected first generation inventory devices, such as bar coding and RFID techniques, because of a perception that the solutions have not been adapted to meet the stringent requirements of the surgical environment. Contrary to popular understanding, however, the RFID tags including tags employing surface acoustical wave technologies may not suffer from many of the perceived limitations. Moreover, the problems which hinder the use of bar coding in the surgical environment do not have the same implications for RFID tags.

As previously mentioned, familiar applications for RFID techniques include "smart labels" in airline baggage tracking and in many stores for inventory control and for theft deterrence. In some cases, the smart labels may combine both RFID and bar coding techniques. The tags may include batteries and typically only function as read only devices or as read/write devices. Less familiar applications for RFID techniques include the inclusion of RFID tags in automobile key fobs as anti-theft devices, identification badges for employees, and RFID tags incorporated into a wrist band as an accurate and secure method of identifying and tracking prison inmates and patrons at entertainment and recreation facilities. Within the medical field, RFID tags have been proposed for tracking patients and patient files, employee identification badges, identification of blood bags, and process management within the factories of manufacturers making products for medical practice.

Typically, RFID tags without batteries (i.e., passive devices) are smaller, lighter and less expensive than those that are active devices. The passive RFID tags are typically maintenance free and can last for long periods of time. The passive RFID tags are relatively inexpensive, generally as small as an inch in length, and about an eighth of an inch in diameter when encapsulated in hermetic glass cylinders. Recent developments indicate that they will soon be even smaller. The RFID tags can be encoded with 64 or more bits of data that represent a large number of unique identification (ID) numbers (e.g., about 18,446,744,073,709,551,616 unique ID numbers). Obviously, this number of encoded data provides more than enough unique codes to identify every item used in a surgical procedure or in other environments that may benefit from asset tracking.

An important attribute of RFID interrogation systems is that a number of tags can be interrogated simultaneously stemming from the signal processing associated with the techniques of impressing the identification information on the carrier signal. A related and desirable attribute is that there is not typically a minimum separation required between the tags. Using an anti-collision algorithm, multiple tags may be readily identifiable and, even at an extreme reading range, only minimal separation (e.g., five centimeters or less) to prevent mutual de-tuning is generally necessary. Most other identification systems, such as systems employing bar codes, usually impose that each device be interrogated separately. The ability to interrogate a plurality of closely spaced tags simultaneously is desirable for applications requiring rapid interrogation of a large number of items.

In addition to tracking and accounting for surgical items, a significant requirement for the management of surgical items involves sterilization procedures and processes. One presently employed sterilization process includes the use of ethylene oxide gas in combination with other gasses at up to three atmospheres of pressure in a special shatterproof sterilization chamber. To achieve effective asepsis levels, this process demands an exposure of the materials to the gas for one or more hours followed by a twelve hour aeration period. The initial gas exposure time is relatively long because the sterilization is effected by an alkylation of amino groups in the proteinaceous structure of any microorganism. Thus, the aforementioned sterilization procedure involves extended exposure of the item to be sterilized to a reactive atmosphere.

A number of other approaches for performing sterilization have also been employed. One such process is high-pressure steam autoclaving. This process exposes the item to be sterilized to high temperatures and is not suitable for materials which are affected by either moisture or high temperature such as corrodible and sharp-edged metals, plastic-made devices or other devices that may be employed in the medical environment. Other sterilization techniques employ x-ray or radioactive sources. While the x-ray procedure is difficult and expensive, the use of a radioactive source requires expensive waste disposal procedures, as well as radiation safety precautions. The radiation techniques also present problems because of radiation-induced molecular changes of some materials which, for example, may render flexible materials such as catheters or bar coded labels brittle.

Other sterilization approaches have been proposed including surface treatment achieved by exposing the medical devices and materials to a highly reducing gas plasma like that generated by gas discharging molecular hydrogen, or to a highly oxidizing gas plasma such as one containing oxygen. Depending on the specific sterilization requirements, a mildly oxidizing environment, somewhere between the environment offered by oxygen and that offered by hydrogen, is presented by gas discharging molecular nitrogen, either in a pure state, or in multi-component mixtures with hydrogen or oxygen, supplemented by an inert gas. In such a manner, plasma discharge chemical-physical parameters can be adjusted to fit almost any practical application of sterilization and surface treatment.

While there are a number of other approaches for performing sterilization, the aforementioned discussion demonstrates that a wide range of thermal, chemical, radioactive and other methods are being employed and further investigated. Very few identification techniques, labeling techniques or marking techniques are compatible with such a wide range of demanding conditions. While a stainless steel instrument may be engraved with a form of a readable tag, such techniques are probably not compatible with disposable items such as sponges.

As alluded to above, RFID tags have been compatible with a number of arduous environments. In the pharmaceutical industry, for instance, RFID tags have survived manufacturing processes that require products to be sterilized for a period of time over 120 degrees Celsius. Products are autoclaved while mounted on steel racks tagged with a RFID tag such that a rack ID number and time/date stamp can be automatically collected at the beginning and end of the process as the rack travels through the autoclave on a conveyor. The RFID tags can be specified to withstand more than 1000 hours at temperatures above 120 degrees Celsius. This is just one example of how RFID tags can withstand the arduous environment including the high temperatures associated with the autoclave procedure, whereas a bar code label is unlikely to survive such treatment.

Returning to the medical environment, on Apr. 4, 2002, Applied Digital Solutions, Inc. announced that it received written guidance that the U.S. Food and Drug Administration (FDA) does not consider its RFID product, VeriChip, to be a regulated medical device. The device has been described in the context of a solution for identifying implanted devices such as pacemakers. Other examples of RFID tags withstanding demanding environments can be seen in the use of such devices for veterinary and animal husbandry purposes. The RFID tags are used to identify millions of livestock animals and pets around the world. The systems track meat and dairy animals, valuable breeding stock and laboratory animals. The tags are typically hermetically sealed and operate over the life of the animal. Body fluids, temperature, mechanical shock, normal electromagnetic interference and radiation such as x-rays do not affect the programmed code within the tag. The tags will not only survive, but will operate reliably in such environments.

While identification tags or labels may be able to survive the difficult conditions associated with medical applications, there is yet another challenge directed to attaching an identification element to a surgical item. The RFID tags are frequently attached to devices by employing mechanical techniques or may be affixed with sewing techniques. A more common form of attachment of a RFID tag to a device is by bonding techniques including encapsulation or adhesion.

While medical device manufacturers have multiple options for bonding, critical disparities between materials may exist in areas such as biocompatibility, bond strength, curing characteristics, flexibility and gap-filling capabilities. A number of bonding materials are used in the assembly and fabrication of both disposable and reusable medical devices, many of which are certified to United States Pharmacopeia Class VI requirements. These products include epoxies, silicones, ultraviolet curables, cyanoacrylates, and special acrylic polymer formulations.

In many instances, the toughness and versatile properties of biocompatible epoxies make them an attractive alternative. Epoxies form strong and durable bonds, fill gaps effectively and adhere well to most types of substrates. Common uses for medical epoxies include a number of applications which require sterilization compatibility such as bonding lenses in endoscopes, attaching plastic tips to tubing in disposable catheters, coating implantable prosthetic devices, bonding balloons to catheters for balloon angioplasty, and bonding diamond scalpel blades for coronary bypass surgery, to name a few. A wide range of such materials are available and some provide high strength bonds which are tough, water resistant, low in outgassing, and dimensionally stable over a temperature range of up to 600 degrees Fahrenheit. Some epoxies can withstand repeated sterilization such as autoclaving, radiation, ethylene oxide and cold (e.g., chemical) sterilization methods.

Regarding the counting of surgical items, a variety of holders are presently available for surgical instruments and disposables items. In many cases, the methods for holding the medical items in a manner that is desirable for transport or for sterilization are combined with configurations for displaying the surgical items in such a way that visual counting can be performed. For instance, U.S. Pat. No. 3,802,555, entitled "Surgical Instrument Package and Handling Procedure," to Grasty, et al., discloses a surgical instrument package and handling procedure including a set of trays having recessed compartments for surgical instruments. Grasty, et al. and many other references teach that counting procedures are performed visually and there is little flexibility in tailoring the type and number of instruments for different procedures.

Recently, computerized devices have been employed to automatically count the instruments. The computerized devices, however, are relatively complex and expensive such as the surgical count stand described in U.S. Pat. No. 4,943,939, entitled "Surgical Instrument Accounting Apparatus and Method," to Hoover. To date, these computerized devices require that the surgical instruments and disposable items be placed in a certain location so that a sensor or vision system can detect the presence or, in some cases, the removal of the instrument. These systems suffer from a number of common shortcomings. For instance, the currently available systems do not disclose an apparatus that automatically counts all types of surgical items, and the systems do not eliminate the time, financial costs, and risk associated with counting and recounting the surgical items to verify the specific identity and location of a missing item.

Accordingly, what is needed in the art is an interrogator, interrogation system and related method to identify and account for all types of items such as surgical items in a medical environment that overcomes the deficiencies of the prior art.

SUMMARY OF THE INVENTION

To address the above-discussed deficiencies of the prior art, the present invention provides an interrogator for use in discerning metal and radio frequency identification (RFID) objects. In one embodiment, the interrogator includes a metal sensing subsystem configured to provide a first signal having a metal signature representing a presence of a metal object such as a metal instrument, and a RFID sensing subsystem configured to provide a second signal having a RFID signature representing a presence of a RFID object such as an object having a RFID information tag. The interrogator also includes a control and processing subsystem configured to discern a presence of at least one of the metal and RFID objects from one of the first and second signals. In a related aspect, the present invention provides a corresponding method of discerning a presence of at least one of metal and RFID objects.

In another embodiment, the present invention provides an interrogator that includes a sensing subsystem configured to provide a signal having at least one of a metal signature representing a presence of a metal object and a RFID signature representing a presence of a RFID object. The interrogator also includes a control and processing subsystem employing an adaptive integrating filter and configured to coordinate a processing of the signal in conjunction with one of an observable and data to discern a presence of at least one of the metal and RFID objects. The data may be located in a database employable by the control and processing subsystem and the interrogator may include a position sensor configured to provide an interrogator location observable. In a related aspect, the present invention provides a corresponding method of discerning a presence of at least one of metal and RFID objects.

In another embodiment, the present invention provides an interrogator that includes a sensing subsystem configured to provide a plurality of signals having at least one of a metal signature representing a presence of a metal object and a RFID signature representing a presence of a RFID object. The interrogator also includes a control and processing subsystem configured to coordinate a processing of the plurality of signals to discern a presence of at least one of the metal and RFID objects. The sensing subsystem may provide the plurality of signals in conjunction with multiple scans and the control and processing subsystem may employ multiscan, coherent signal processing. In a related aspect, the present invention provides a corresponding method of discerning a presence of at least one of metal and RFID objects.

In another aspect, the present invention provides an interrogation system that may be employable, without limitation, within a medical facility. The interrogation system includes a computer system and a transceiver that transmits and receives signals associated with the computer system. The interrogation system also includes an interrogator having a metal sensing subsystem that provides a first signal with a metal signature representing a presence of a metal object, and a RFID sensing subsystem that provides a second signal with a RFID signature representing a presence of a RFID object. The interrogator also includes a control and processing subsystem that discerns a presence of at least one of the metal and RFID objects from one of the first and second signals, and a communications subsystem that communicates with the transceiver.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
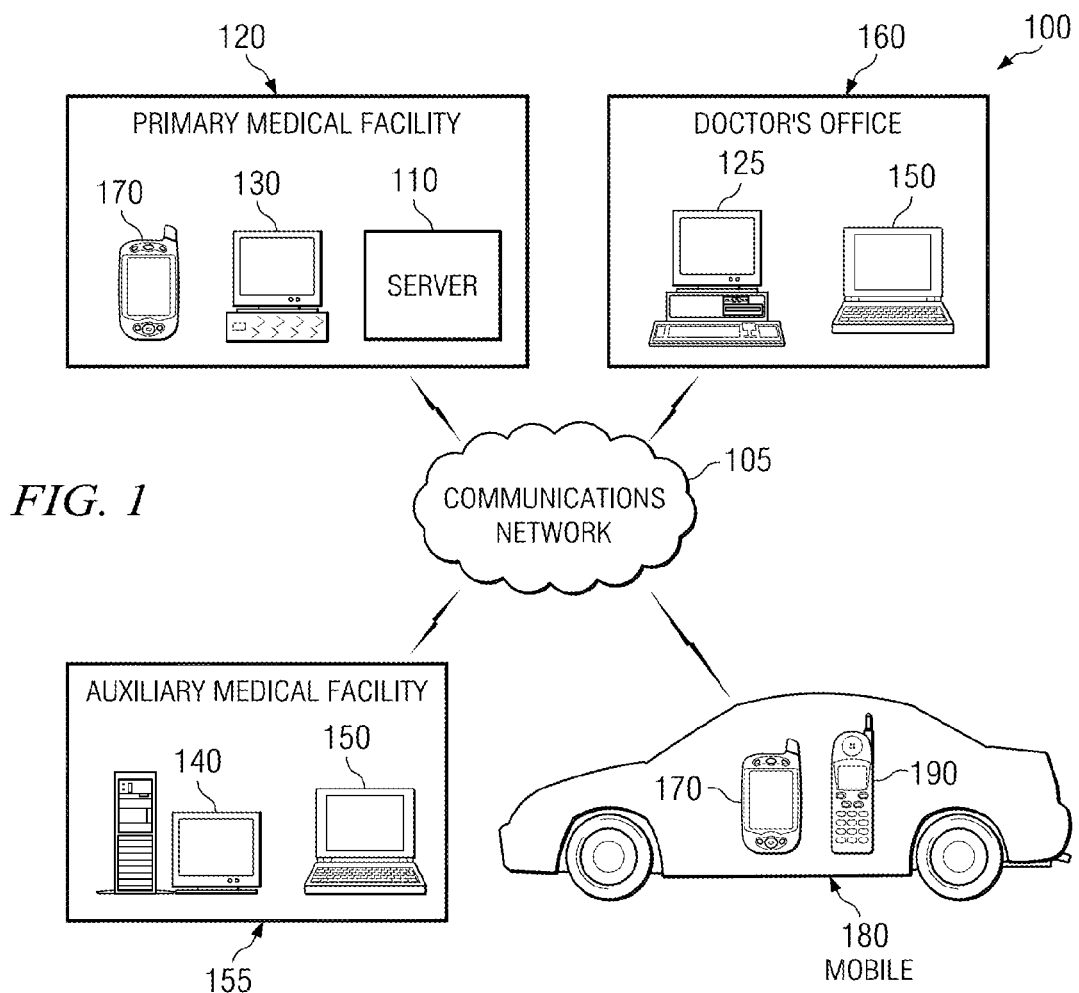
FIG. 1 illustrates a diagram of an embodiment of a communication system employable in a medical environment constructed in accordance with the principles of the present invention.

Referring initially to FIG. 1, illustrated is a diagram of an embodiment of a communication system, generally designated 100, employable in a medical environment constructed in accordance with the principles of the present invention. The communication system 100 is configured to distribute, collect and process information across a communications network 105 that may include a Local Area Network (LAN), a Wide Area Network (WAN), an Intranet, an Extranet, the Internet, the World Wide Web, the Public Switched Telephone Network (PSTN), future extensions of these (e.g., the Internet 2), or a combination thereof. For purposes of the present invention, the World Wide Web is defined as all the resources and users on the Internet that are generally using the Hypertext Transfer Protocol (HTTP). In one embodiment of the present invention, the communication system 100 communicates to each device connected thereto using Transmission Control Protocol/Internet Protocol (TCP/IP).

TCP/IP is a two-layered protocol. The higher layer, Transmission Control Protocol (TCP), manages the assembling of a message or file into smaller packets that are transmitted over the communications network 105 and received by a TCP layer that reassembles the packets into the original message. The lower layer, Internet Protocol (IP), handles the address part of each packet so that it gets to the right destination. Each gateway computer on the communication system 100 checks the address to determine where to forward the message. Even though some packets from the same message are routed differently than others, the packets will be reassembled at the destination.

TCP/IP uses the client/server model of communication in which a computer user (a client) requests and is provided a service (such as sending a Web page) by another computer (a server) in the communication system 100. TCP/IP communication is primarily point-to-point, meaning each communication is from one point (or host computer) in the communication system 100 to another point or host computer. TCP/IP and the higher-level applications that employ TCP/IP are collectively said to be "stateless" because each client's request is considered a new request unrelated to any previous one (unlike ordinary phone conversations that require a dedicated connection for the call duration). Being stateless frees the network paths so that everyone can use the paths continuously. It should be understood that the TCP layer itself is not considered stateless as far as any one message is concerned; the connection remains in place until all packets in a message have been received.

Internet users are familiar with the even higher layer application protocols that use TCP/IP to get to the Internet. The higher level application protocols include the World Wide Web's Hypertext Transfer Protocol (HTTP), the File Transfer Protocol (FTP), Telnet (a command and protocol that allows users to logon to remote computers), and the Simple Mail Transfer Protocol (SMTP). These and other protocols are often packaged together with TCP/IP.

Personal computer users usually access the Internet through the Serial Line Internet Protocol (SLIP) or the Point-to-Point Protocol (PPP). These protocols encapsulate the IP packets such that the packets can be sent over a dial-up phone connection to an access provider's connection device such as a conventional modem.

Protocols related to TCP/IP include the User Datagram Protocol (UDP), the Internet Control Message Protocol (ICMP), the Interior Gateway Protocol (IGP), the Exterior Gateway Protocol (EGP) and the Border Gateway Protocol (BGP). Depending on the circumstance, the UDP may be used instead of TCP for special network communication purposes. The aforementioned protocols, namely, ICMP, IGP, EGP and BGP, are often used by network host computers for exchanging router information.

Besides the Internet, TCP/IP may also be employed as the communication protocol in the private networks called Intranets and Extranets. An Intranet is a private network that is contained within an enterprise (such as a organization's office building). The Intranet may consist of many interlinked LANs and use leased lines in a WAN. Typically, an Intranet includes connections through one or more gateway computers (not shown) to the outside Internet. The main purpose of an Intranet is to share organizational information and computing resources among employees. An Intranet can also be used to facilitate working in groups and for teleconferences.

An Intranet typically uses TCP/IP, HTTP and other Internet protocols and in general looks like a private version of the Internet. With tunneling, organizations can send private messages through the public network, using the public network with special encryption/decryption and other security safeguards to connect one part of the Intranet to another.

An Extranet is a private network that uses the Internet protocols and may use the public network to securely share part of a organization's information or operations with suppliers, vendors, partners, customers, or other medical organizations. An Extranet can be viewed as part of an organization's Intranet that is extended to users outside the organization. Just like the Internet, an Extranet also uses HTML, HTTP, SMTP and other Internet protocols.

An Extranet also requires security and privacy provided by the use of firewalls. Firewalls are typically servers that have the ability to screen messages in both directions so that security is maintained. Firewall servers use digital certificates or similar means of user authentication, encryption of messages, and the use of virtual private networks (VPNs) that tunnel through the public network.

A medical organization can use an Extranet to exchange large volumes of data using Electronic Data Interchange (EDI) and share information between facilities associated therewith. The Extranet can also be employed to allow an organization to collaborate with other organizations on joint development efforts and jointly develop and jointly use training programs. Via the Extranet, an organization can also provide or access services provided by one organization to a group of other organizations, such as a medical record management application managed by one organization on behalf of the medical organization, and share information of common interest exclusively with partner organizations.

Within the medical environment of the communication system 100 is a server 110 located at a primary medical facility 120 that includes systems that allow the server 110 to receive requests, perform specific tasks, retrieve and update information in at least one database and respond to requests sent over the communication system 100 to the server 110. In other embodiments, the communication system 100 may include multiple servers, each performing specific tasks, performing the same tasks, acting as redundant systems or acting as database sites.

In another embodiment of the present invention, the server 110 may be an application server. An application server is a computer in a distributed network containing specialized programs that provide the business logic for at least one application program located somewhere within the communication system 100. The application server is frequently viewed as part of a three-tier application, consisting of a graphical user interface (GUI) server, an application (business logic) server, and a database and a transaction server. The first-tier of the application, also called "front-end," is usually located in a client computer such as a personal computer (PC) or a workstation and may include a Web browser-based graphical user interface. The second-tier is the business logic application or set of applications and can be located on a LAN or an Intranet server.

The third-tier of the application, also called "back-end," is the database and transaction server and may be located on a mainframe or a large server. Older, legacy databases and transaction management applications are part of the back-end or third-tier. The application server is the middleman between the browser-based front-ends and the back-end databases and legacy systems.

In many instances, the application server is combined with or works with a Web server and is called a "Web application server." The Web browser supports an easy-to-create HTML-based front-end for the user. The Web server provides several different ways to forward a request to an application server and to send a modified or new Web page to the user. These approaches include the Common Gateway Interface (CGI), FastCGI, Microsoft's Active Server Page (ASP) and the Java Server Page (JSP). In some cases, the Web application servers also support request "brokering" interfaces such as CORBA's Internet Inter-ORB Protocol (IIOP).

The communication system 100 also includes conventional personal computers (PCs) 125, workstations 130, office computer systems 140 and laptop computers 150. In other embodiments, the communication system 100 may include any number of PCs 125, workstations 130, office computer systems 140 and laptop computers 150. In one embodiment of the present invention, the PCs 125, the workstation 130, the office computer system 140 and the laptop computers 150 are client computer systems. A client computer system includes a user interface that allows the user to access information, issue requests and perform functions related to the server 110. In another embodiment, the office computer system 140 may be configured as a second-tier type computer system. For illustrative purposes only, the PCs 125, the workstation 130, the office computer system 140 and the laptop computers 150 are located in ones of the primary medical facility 120, auxiliary medical facility 155 and doctor's office 160 as shown.

In the illustrated embodiment, the communication system 100 also includes a handheld device 170 such as a personal digital assistant (PDA) or a tablet PC. A PDA is a term used for any small mobile hand-held device that provides, in part, computing, information storage and retrieval capabilities. PDAs are often used for keeping schedules, calendars, address book information and medical information (examples of PDAs include Hewlett-Packard's Palmtop™ and 3Com's PalmPilot™). A tablet PC is a compact device similar to a laptop computer but with a handwriting recognition capability (examples of tablet PCs include Compact TC1000 and ViewSonic V1100).

Most PDAs have a small keyboard and some PDAs have an electronically sensitive pad on which handwriting can be received and recognized. Apple's Newton™, which has been withdrawn from the market, was the first widely-sold PDA that accepted handwriting. Many applications have been written for PDAs including network programs and Internet access programs. PDAs are increasingly combined with telephones and paging systems for wireless communications. Some PDAs offer a variation of the Microsoft Windows™ operating system called Windows CE™. Other PDA products use a proprietary operating system, such as PalmOS™ or third party operating systems.

An individually addressable vehicle (IAV) 180 such as an ambulance is also located within the communication system 100. The IAV 180 can include any type of vehicle capable of having a computer with a wireless network receiver and/or transmitter that is individually addressable. For example, an ambulance containing an Internet terminal is an IAV or a computer with a wireless receiver/transmitter and sensors that transmits patient information falls within the class of IAVs.

In the illustrated embodiment, the IAV 180 can send requests to the server 110 within the communication system 100 to request information or perform specific functions, such as retrieving information related to the location of the vehicle or general patient information. The IAV 180 may include a display (not shown) and an input device (not shown) such as push buttons, a touch screen or a combination of the two to facilitate user interface therewith.

A mobile telephone 190 may also be included in the communication system 100. The mobile telephone 190 includes a display capable of showing information retrievable from the communication system 100. The mobile telephone 190 can send and retrieve information from the server 110 and perform specialized tasks associated with the capabilities of a mobile telephone with network capabilities. In one embodiment, the mobile telephone 190 is capable of accessing Web pages, traversing the Internet and displaying information associated with Web pages on its display.

One skilled in the pertinent art should know that the principles of the present invention are not limited for use with the types of devices described above. In other embodiments, the communication system 100 may include individually accessible electronic devices (IAEDs). IAEDs are electronic devices having a network interface that are individually addressable on a network. For example, medical equipment in a medical facility connected to a network having a unique network address is representative of an IAED.

One skilled in the pertinent art should also know that the principles of the present invention may be employed via conventional hardwired or wireless communications networks. For instance, a PDA 170 within the primary medical facility 120 may communicate patient information to the workstation 130 via a wireless link compatible with a Bluetooth communications environment as defined in the Bluetooth Specification, Version 1.1, or an IEEE 802.11 communications environment as defined in the Institute of Electronic and Electrical Engineers Specification, Section 802.11, both of which are herein incorporated by reference in their entirety. Of course, other existing or future wireless specifications including those employing a proprietary system may also be used. The workstation 130 may then download the information to the server 110 via a hardwired connection. Of course, the networks within the medical facilities and the communications network 105 itself may include hardwired and wireless segments. It should also be clear that the principles of the present invention are not limited to a communication system in a medical environment.

For a better understanding of communication systems and networks in general, see "Wireless Communications, Principles and Practice," by Theodore S. Rappaport, Prentice Hall PTR, 1996, "Microwave Mobile Communications," edited by William C. Jakes, IEEE Communications Society, 1993, and "Digital Communications," $3^{rd}$ Edition, by John C. Proakis, McGraw-Hill, Inc., 1995, all of which are herein incorporated by reference in their entirety.

Figure 2:
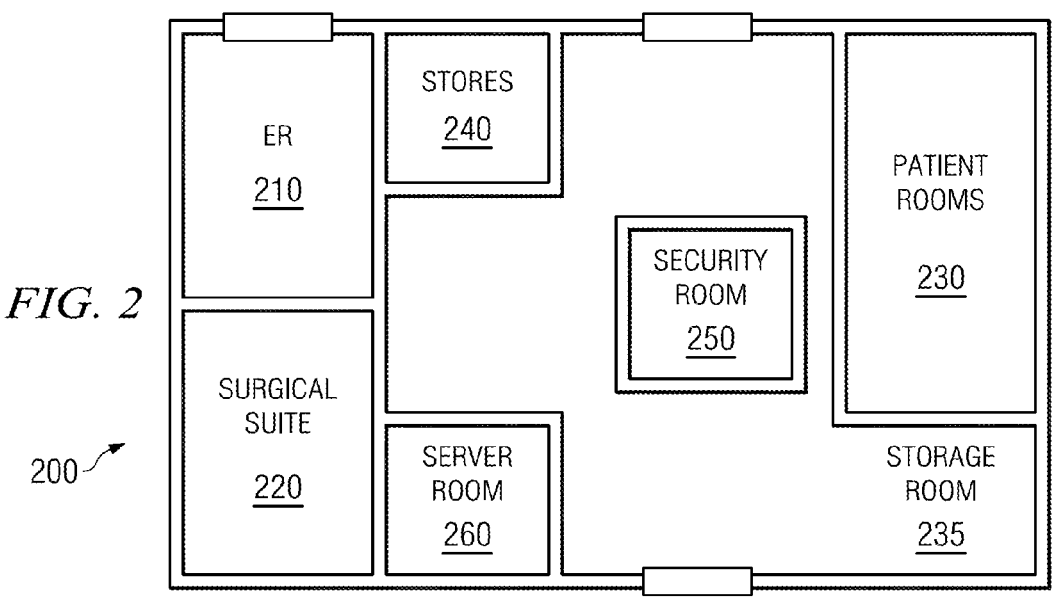
FIG. 2 illustrates a floor plan of an embodiment of a primary medical facility that provides an exemplary environment for the application of the principles of the present invention.

Turning now to FIG. 2, illustrated is a floor plan of an embodiment of a primary medical facility, generally designated 200, that provides an exemplary environment for the application of the principles of the present invention. The primary medical facility 200 includes an emergency room (ER) 210, surgical suite 220, patient rooms 230, retail stores 240, security room 250 and a server room 260. Of course, other designated areas such as a cafeteria may also be located in the primary medical facility 200.

As mentioned above, the primary medical facility 200 includes a communications network having hardwired and wireless segments and communication devices such as workstations, laptop computers, tablet computers and PDAs, to name a few. In conjunction therewith, antennas may be located in the walls and ceilings of the primary medical facility 200 to facilitate wireless communication throughout the facility. Additionally, an interrogation system capable of tracking assets in the primary medical facility 200 may be located throughout the facility including sensing subsystems proximate the exits. On a grand scale, the interrogation system including the identification tags affixed to the asset can substantially reduce the risk of losing assets such as modular patient monitoring equipment. Moreover, the interrogation system may be employed to track patients bearing an identification tag not only to note their location, but also their authorization to be in specific locations and proximate other tagged individuals (e.g., patients, staff, visitors, etc.).

As an example of the applicability of the interrogation system and the advantages associated therewith, proximate the patient rooms 230 of the primary medical facility 200 is a storage room 235. Assuming that the assets and supplies associated with the primary medical facility 200 include an identification tag, the interrogation system could track the location, use, etc. of the assets akin to a supply chain management system. Consequently, not only are the assets and supplies more effectively tracked within the primary medical facility 200, but the inventory system may be coordinated with the suppliers to more efficiently maintain the inventory. Moreover, such an interrogation system may be applied to a wide range of applications and environments such as supply chain management systems in retail facilities or security systems in airports, to name a few.

For a better understanding of communication systems including antenna design and communications, etc., see "Antenna Engineering Handbook," by Richard Johnson and Henry Jasik, McGraw-Hill, Inc., 1992, and "Wideband Wireless Digital Communications," by Andreas F. Molisch, Pearson Education, 2000, which are herein incorporated by reference in their entirety.

Figure 3A:
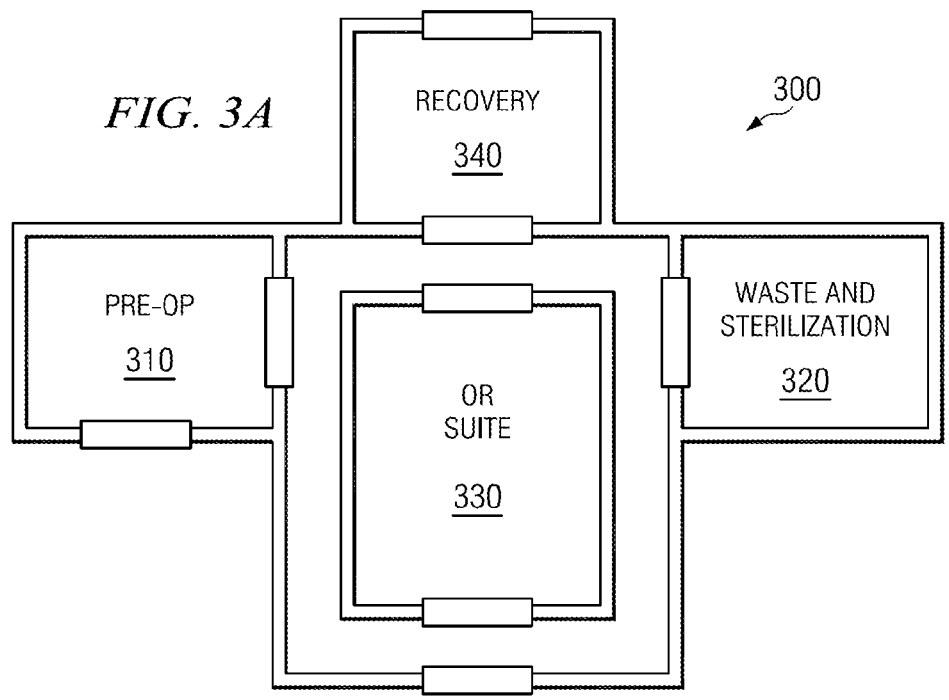
FIG. 3A illustrates a floor plan of an embodiment of a surgical suite that provides an exemplary environment for the application of the principles of the present invention.

Turning now to FIG. 3A, illustrated is a floor plan of an embodiment of a surgical suite, generally designated 300, that provides an exemplary environment for the application of the principles of the present invention. The surgical suite 300 includes a pre-operation room 310, waste and sterilization suite 320, an operating room suite 330 and a recovery room 340. The pre-operation room 310 is a location wherein a patient is prepared for a pending surgical procedure. The operating room suite 330 includes a plurality of sterile operating rooms wherein the surgical procedures are performed. Finally, the recovery room 340 is a location wherein the patient initially recovers following the conclusion of the surgical procedure.

As previously discussed, the surgical items must be thoroughly sterilized and packaged prior to being employed in a surgical environment. The waste and sterilization room 320 is a location within the surgical suite 300 wherein the surgical items are sterilized employing chemical processes and autoclaving procedures and packaged for the specific procedures. All surgical items including surgical instruments and disposable items must be able to withstand the rigorous procedures associated with the sterilization process.

This cleaning and decontamination process of non-disposable equipment typically consists of several steps. First there is an initial cleaning where the equipment is simply hosed off with water. Then, the equipment will typically be placed in a washing machine where it is subjected to multiple steps such as: cleaning via a medical enzymatic detergent and pre-soak, a second cleaning with a low suds detergent and finally an instrument lubrication cycle. The instruments are then typically removed to a kitting room where each kit is restored to a complete status and placed into a stainless steel container and a tamper-proof seal is deployed. There are many different kits for the various types of surgical procedures, each requiring a unique set of instruments. A hospital will typically have to maintain hundreds of different types of kits and several units of each type. Each one is individually cleaned and inventoried each time. This is very time consuming and labor intensive.

After kitting, the containers proceed to sterilization where multiple different types of sterilization procedures may be deployed based on the nature of the equipment. Where possible, high-pressure steam is used, as this is usually the least expensive approach. However, necessary instruments will often require different sterilization procedures such as, but not limited to, Ethylene Oxide Sterilization, $H_2O_2$—Plasma sterilization, and Liquid $H_2O_2$ Sterilization. Of course, the layout of the surgical suite 300 and the aforementioned procedures are but one example of a surgical suite and related procedures.

Figure 3B:
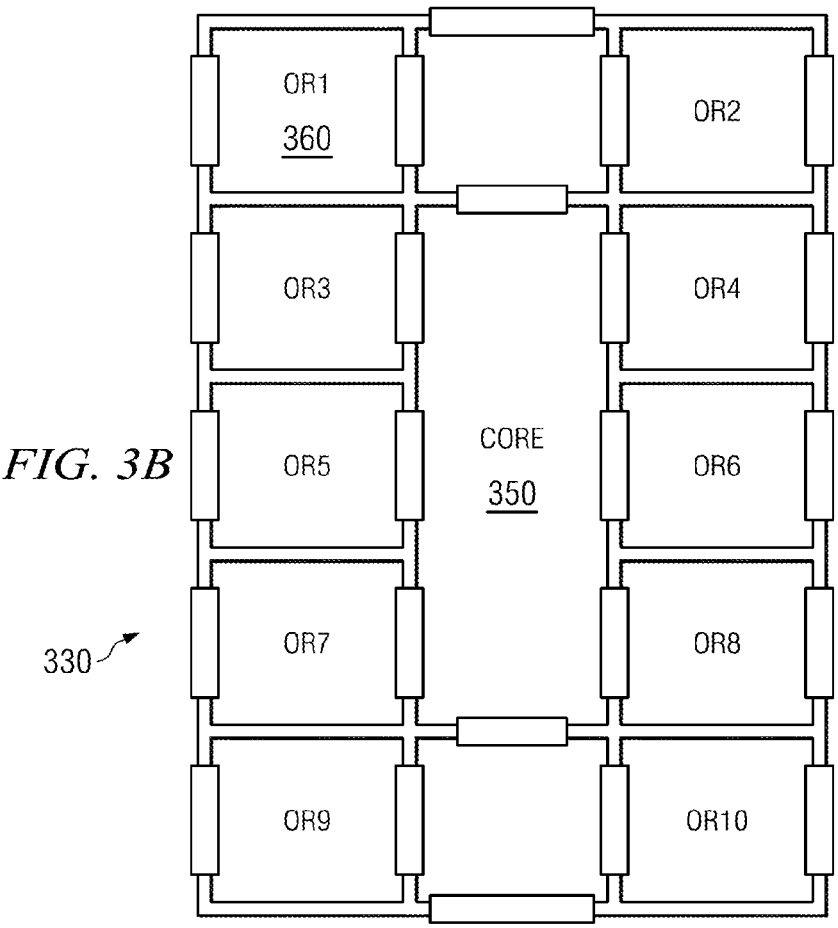
FIG. 3B illustrates a floor plan of the operating room suite of the surgical suite of FIG. 3A that provides an exemplary environment for the application of the principles of the present invention.

Turning now to FIG. 3B, illustrated is a floor plan of the operating room suite 330 of the surgical suite 300 of FIG. 3A that provides an exemplary environment for the application of the principles of the present invention. The operating room suite 330 includes a core 350 and a plurality of operating rooms (one of which is designated 360). The core 350 includes sterile storage to house the instrument kits by type of surgical procedure. The instrument kits are provided to the operating rooms 360 through an inner door thereto. A patient enters an outer door to the operating room 360 wherein a surgical procedure is performed.

As previously mentioned, the surgical items must be counted and accounted for before, during and following the conclusion of a surgical procedure. The presently available systems to track the surgical items are laboriously time consuming, costly and in many cases antiquated. Thus, a medical facility can benefit from systems that more efficiently track surgical items. The systems may include the communication systems and networks as noted above as well as identification tags and interrogation systems that will herein be described. As described above with respect to the storage room 235 of the primary medical facility 200 of FIG. 2, the interrogation system may assist in the coordination of the supply chain management of the surgical items employable within the surgical suite 300. Again, this type of interrogation system may be employed in other environments and still realize the benefits associated therewith.

Figure 4:
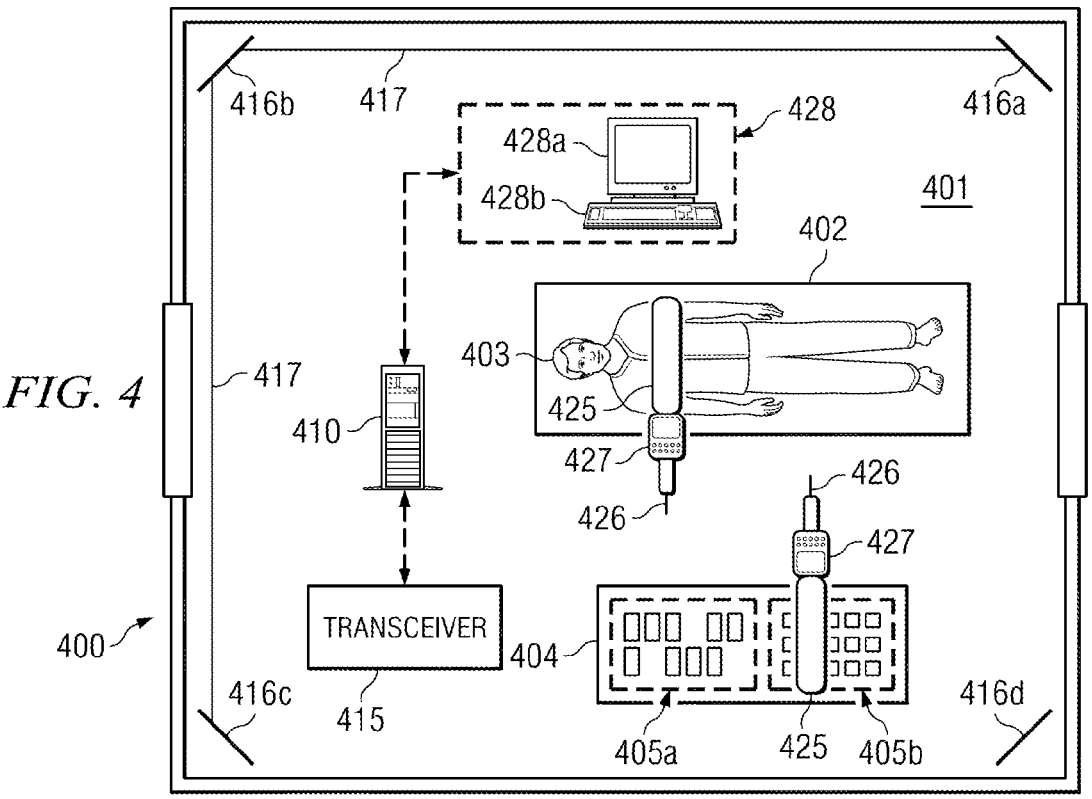
FIG. 4 illustrates a pictorial diagram of an embodiment of an interrogation system employable within an operating room of a medical facility and constructed in accordance with the principles of the present invention.

Turning now to FIG. 4, illustrated is a pictorial diagram of an embodiment of an interrogation system, generally designated 400, employable within an operating room of a medical facility and constructed in accordance with the principles of the present invention. In the illustrated embodiment, the interrogation system 400 is employed within the operating room having an operating table 402 with a patient 403 thereon and a back table 404 that accommodates a plurality of surgical instruments 405a and disposable items 405b (such as sponges). Other equipment, such as Mayo stands, ring stands, additional back tables and a kick-bucket are also well known to those familiar with the operating room environment and will also likely be present in some quantity and arrangement. The interrogation system 400 includes a computer system 410, an operating room transceiver 415 that transmits and receives signals associated with the computer system 410 and an interrogator (e.g., a portable interrogator) 425. It should be understood that the interrogator may be affixed to a table (e.g., the back table 404), stand, wall or ceiling within a facility and may also be embodied in multiple coordinated systems and subsystems, both hardware and software.

The computer system 410 may operate as a client that is coupled to a server associated with the medical facility or, alternatively, the computer system 410 may be a stand-alone unit solely dedicated to the operating room 401. The transceiver 415 is coupled between the computer system 410 and the portable interrogator 425 and is employed to transmit signals to and receive signals from the portable interrogator 425.

In the illustrated embodiment, the transceiver 415 includes transmit and receive sections that are coupled through a wired connection 417 to an antenna array having first, second, third and fourth antenna elements 416a, 416b, 416c, 416d located proximate the corners of the operating room 401. The antenna array may be employed by the transceiver 415 to wirelessly communicate with the portable interrogator 425 through an interrogator antenna 426 included in the portable interrogator 425. The interrogator antenna 426 may be external as shown, or alternatively, it may be integrated into the body of the portable integrator 425. Of course, other antenna configurations including additional or fewer antenna elements or alternate placements may be employed as directed by specific parameters or characteristics associated with an operating room environment.

The portable interrogator 425 includes a metal sensing subsystem that provides a first signal having a metal signature representing a presence of a metal object and a radio frequency identification (RFID) sensing subsystem that provides a second signal having a RFID signature representing a presence of a RFID object. In the illustrated embodiment, the metal sensing subsystem is configured to employ a metal sensing interface and a metal sensing antenna. Similarly, the RFID sensing subsystem is configured to employ a RFID sensing antenna interface and a RFID sensing antenna. In an alternative embodiment, the metal and RFID sensing subsystems are configured to employ an antenna diplexer and an integrated sensing antenna. Alternatively, the metal and RFID sensing subsystems may be integrated into a sensing subsystem that provides a signal or a plurality of signals having at least one of a metal signature representing a presence of a metal object and a RFID signature representing a presence of a RFID object.

The portable interrogator 425 also includes a control and processing subsystem that discerns a presence of at least one of the metal and RFID objects from one of the first and second signals. The control and processing subsystem may also coordinate a processing of the signal(s) from the sensing subsystem to discern a presence of at least one of said metal and RFID objects. The control and processing subsystem may also employ an adaptive integrating filter and coordinate a processing of the signal(s) in conjunction with one of an observable and data to discern a presence of at least one of the metal and RFID objects. The portable interrogator 425 also includes a communications subsystem, coupled to the interrogator antenna 426, that allows communication with the transceiver 415. The portable interrogator 425 further includes an internal user interface 427 and an external user interface 428 that is coupled to the computer system 410, in the illustrated embodiment. The portable interrogator 425 still further includes a position sensor that allows a position of the portable interrogator 425 to be determined The portable interrogator 425 may also have a wired interface, for example, a Universal Serial Bus (USB) port.

Prior to starting a surgical procedure, the portable interrogator 425 may be employed to inventory the plurality of surgical instruments 405a and disposable items 405b in the operating room 401. This may be accomplished by scanning the plurality of surgical instruments 405a and disposable items 405b with the portable interrogator 425, before surgery begins. Alternatively, a separate asset management system may provide this information to the portable interrogator 425. Verification of the inventory may employ both approaches. In addition, the presence of a particular kind of surgical instrument 405a may be verified through the scanning action as was requested by a medical professional. The request may have been arranged through the computer system 410 or through a medical professional's PDA. During the surgical procedure, the portable interrogator 425 may be employed to monitor any movement or repositioning of the plurality of surgical instruments 405a and disposable items 405b thereby providing location tracking during use of any of the items in the surgical procedure.

Additionally, the portable interrogator 425 may be employed to scan the patient 403 before, during or after closing the surgical procedure. Scanning the patient 403 before the surgical procedure provides location of metal or RFID objects already present in the patient 403. Scanning the patient 403 during the surgical procedure provides a real-time, operational assurance that the location of the plurality of surgical instruments 405a and disposable items 405b are where they are intended to be. Scanning the patient 403 after concluding the surgical procedure provides a verification that any metal or RFID objects remaining are only those intended. In addition, the portable interrogator 425 may make multiple scans about the patient 403 to further assist in ascertaining a location of any metal or RFID objects.

The portable interrogator 425 may be employed in either an autonomous or an integrated mode of operation. In the autonomous mode of operation, the control and processing subsystem autonomously accomplishes the operation of the portable interrogator 425, provides all analysis algorithms and performs all functions needed to discern the presence of metal and RFID objects that have been scanned by the portable interrogator 425. Alternatively, the integrated mode of operation employs the computer system 410, either wirelessly via the transceiver 415, the antenna array and the interrogator antenna 426 or through the wired interface, to support the control and processing subsystem in discerning the presence of metal and RFID objects. The integrated mode may provide for a greater selection of sensors and sensed items that may be integrated into an enhanced solution. The integrated mode typically allows a more extensive utilization of databases and algorithms to be employed than in the autonomous mode of operation.

The majority of moveable metal objects employed in the operating room 401 are typically surgical instruments or sharps of various sizes and shapes or metal structures intended to be surgically implanted in the patient 403. Other metal objects may include disposable sponges employing a metal wire that allows their detection by the metal sensing subsystem. Each of the metal objects generates a metal signature that allows its detection by the portable interrogator 425. Generally, the metal signature may cause its associated first signal to posses a universal characteristic, such as a shape, an amplitude or a frequency spectrum, that indicates metal is present. More specifically, the metal signature may cause the first signal to possess a particular characteristic that is substantially unique to a particular type of metal object thereby allowing a more unique identification.

RFID signatures differ from metal signatures in that the RFID signature, associated with the second signal, is unique and independent of a shape or a size of the RFID object. The RFID signature is normally provided by a RFID tag (e.g., a RFID information tag including data thereon) applied to the object. If a RFID tag were applied to a surgical metal instrument, for example, the portable interrogator 425 would recognize a unique RFID signature as well as the metal signature that may be general or specific to the surgical metal instrument. The metal signature may be used to discern that an object is a metal object, or that it is a type of surgical metal instrument. However, the RFID signature may be used to discern exactly which surgical metal instrument the metal object is. Additionally, RFID tagging of disposable items, such as sponges, may provide a unique RFID signature for each item, whereas disposable items incorporating only a metal wire may typically provide a metal signature specific to all such items.

The internal user interface 427 typically includes an integral display employing alphanumeric or graphical characters and a touchpad for entering data or information. The internal user interface 427 may also employ audible or visual alarms. In the illustrated embodiment, the external user interface 428 includes a monitor 428a and a keyboard 428b that are wirelessly coupled to the portable interrogator 425 and the computer system 410. Alternatively, the wired interface of the portable interrogator 425 may be employed to couple the external user interface 428 to the portable interrogator 425. The external user interface 428 may provide a more extensive data entry capability while facilitating a broader monitoring capability than may be provided by the internal user interface 427.

Position monitoring of the portable interrogator 425 is provided by the position sensor, which allows a relative determination of its position with respect to the patient 403, the back table 404 or another location. RFID position markers may be placed on the patient 403 at predetermined benchmark positions, such as the nose, navel, knee and ankle, to provide substantially unique patient dimensions (or a location of a feature of a patient) and allow other patient attribute positions and metrics to be more accurately determined Additionally, RFID/metal calibration markers may be positioned at other locations on the patient 403 to allow the portable interrogator 425 to calibrate depths or other appropriate thicknesses associated with the patient 403. Of course, RFID markers may be placed on items such as the back table, ring stand, the Mayo stand or any other location within the operating room deemed appropriate.

A plurality of the portable integrators 425 may be coupled together mechanically or electrically, either wirelessly or through their wired interfaces, to form a networked-interrogator mode of operation. The networked-interrogator mode of operation allows two or more interrogators to share and collaborate data. This collaboration may include the coordination of a plurality of interrogators simultaneously employed on the patient 403. Alternatively, the collaboration may also include coordinating information associated with the operating room 401, such as information associated with items on the back table 404, as well as other pertinent information located within the medical facility environment. This collaborative effort may occur in real time or over a period of time and may employ the interrogators operating in an autonomous mode, an integrated mode or a combination of the modes.

Figure 5A:
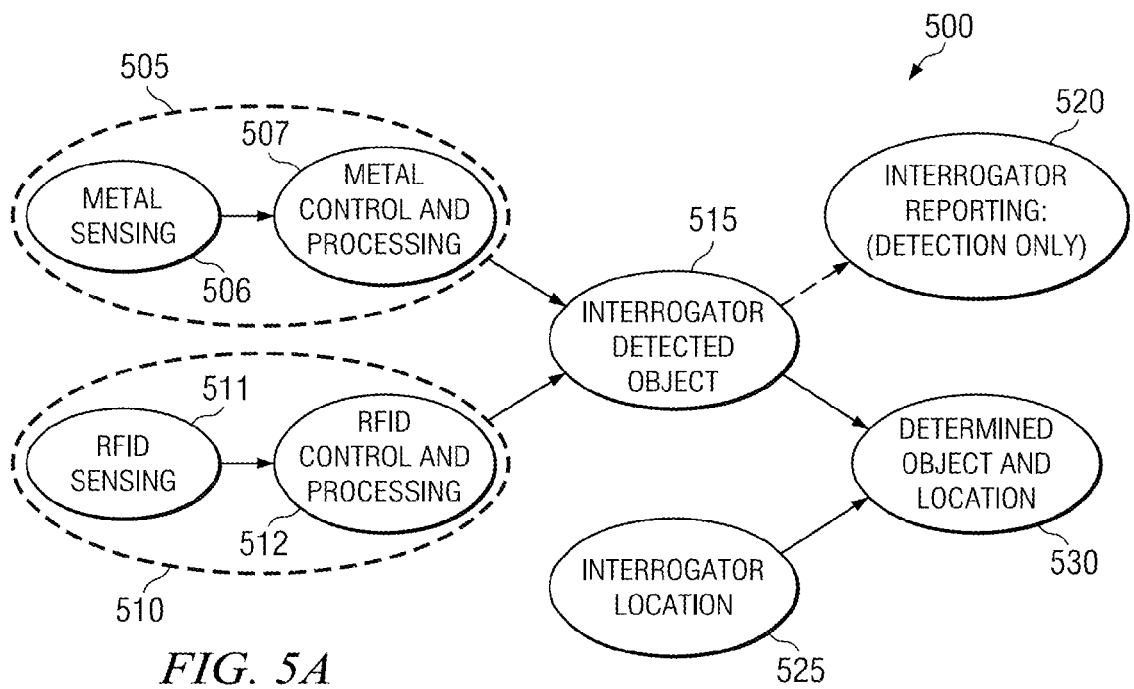
FIGS. 5A and 5B illustrate relationship diagrams showing embodiments of attributes that may be associated with autonomous and integrated modes of operation of an interrogator, constructed in accordance with the principles of the present invention.
Figure 5B:
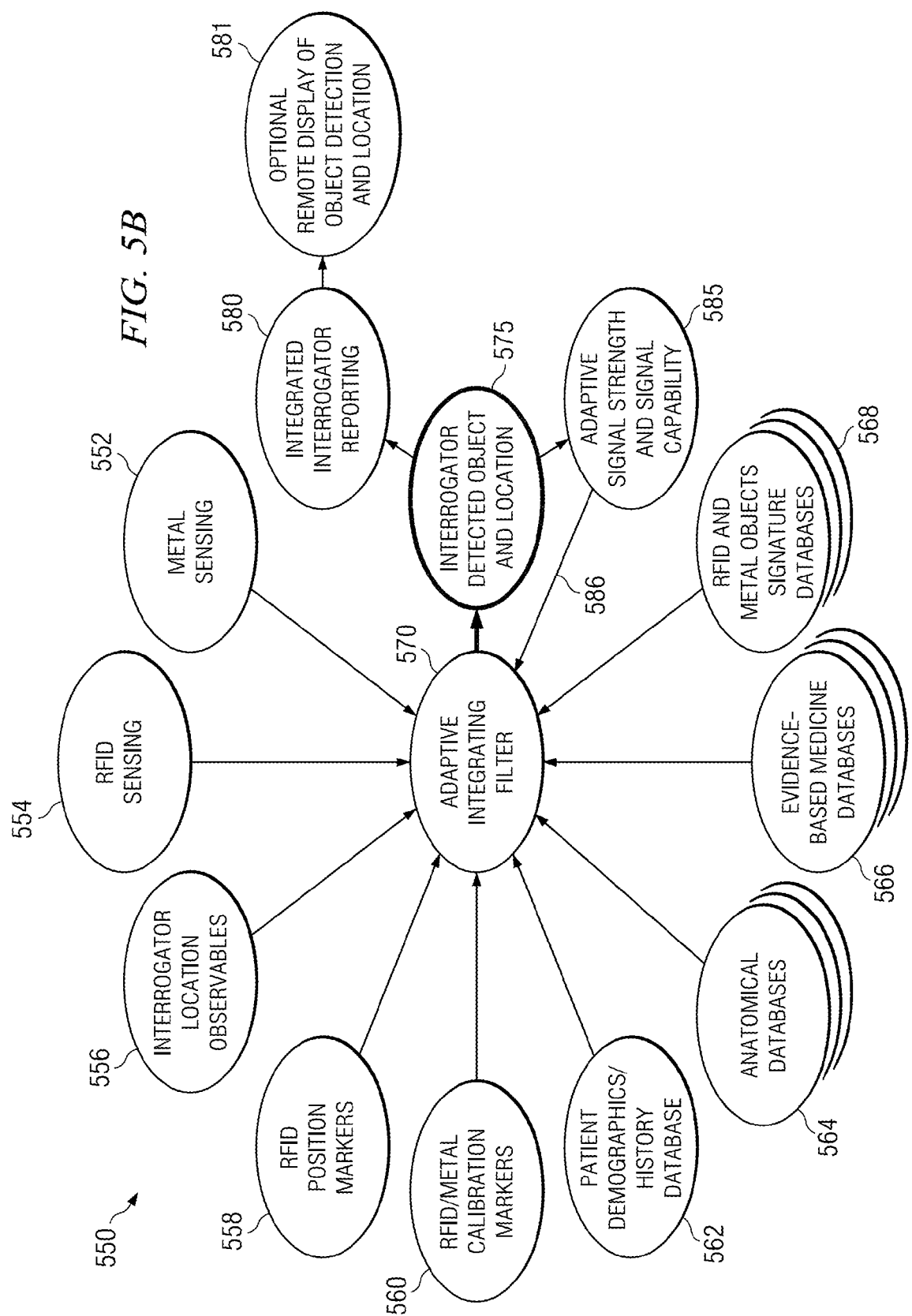

Turning now to FIGS. 5A and 5B, illustrated are relationship diagrams, generally designated 500 and 550 respectively, showing embodiments of attributes that may be associated with autonomous and integrated modes of operation of an interrogator, constructed in accordance with the principles of the present invention. In the illustrated embodiment, the relationship diagram 500, associated with the autonomous or nominal sensitivity mode of operation, employs a metal system 505 and a RFID system 510 as inputs. The metal system 505 provides metal sensing 506 and metal control and processing 507. The RFID system 510 provides RFID sensing 511 and RFID control and processing 512.

The metal system 505 may be used to detect a presence and a general location of metal objects within a patient. Similarly, the RFID system 510 may be used to detect a presence and a general location of objects within the patient that employ RFID tags. Then, an interrogator detected object 515 provides an indication of these detected metal or RFID objects, and an interrogator reporting 520 provides a representation of this detection. When the interrogator detected object 515 is combined with an interrogator location (e.g., operator-determined interrogator location) 525, a determined object and location (e.g., operator-determined object and location) 530 may be provided employing the interrogator operating in an autonomous mode.

The relationship diagram 550 of FIG. 5B, associated with the integrated or enhanced mode of operation, employs an expanded plurality of inputs as compared to the autonomous mode of operation. In the illustrated embodiment, this plurality of inputs includes metal sensing 552, RFID sensing 554, interrogator location observables 556, RFID position markers 558, RFID/metal calibration markers 560, a patient demographics/history database 562, anatomical databases 564, evidence-based medicine databases 566 and RFID and metal object signature databases 568.

An adaptive integrating filter 570 processes these inputs to provide a resulting interrogator detected object and location 575. The interrogator detected object and location 575 allows an integrated interrogator reporting 580, which is typically more comprehensive than the autonomous mode of operation. An optional remote display of object detection and location 581 allows enhanced object display and location presentations. An adaptive signal strength and signal capability 585 employs a feedback path 586 to the adaptive integrating filter 570 to allow extended object detection and location enhancement.

The integrated mode of operation allows the incorporation of real time, adaptive characteristics that may be based on specific patient attributes or specific anatomical locations being scanned at any specific time. The integrated mode of operation may employ multiscan, coherent signal processing of diverse multiple inputs to achieve significantly higher detection sensitivities thereby allowing more precise object location and identification. The adaptive integrating filter 570 may be a single adaptive filter, such as a Kalman filter, or it may be more complex to meet a specific patient situation.

A more precise location of the interrogator may be afforded by integrating an instantaneous output of an internal inertial position sensor with RFID position markers 558 placed at predetermined anatomical locations on the patient. RFID/metal calibration markers 560 typically placed at other specific patient locations, where an associated amount of "body-masking" will occur, allows tailoring of the RFID and metal detection responses for specific patient requirements.

Integrating information from databases allows an additional degree of enhancement. The patient demographics/history database 562 may provide patient specific information such as height, weight, age, ethnicity, medical history and past surgeries as well as distinctive foreign objects known to be present such as screws, pins, artificial joints, etc. The anatomical databases 564 may be correlated to specific patient information to provide anatomy information that is generally applicable to the demographics of the patient or specifically applicable to the history of the patient. The evidence-based medicine databases 566, such as Cochrane or Best Evidence, may provide conscientious, explicit and judicious use of current best evidence in making clinical decisions about the care of individual patients.

The RFID and metal object signature databases 568 may provide a catalog of RFID tag numbers that are pertinent to a specific operating room or medical facility environment. Similarly, a catalog of metal object signatures that are pertinent to the metal objects employed in the operating room or medical facility may also be provided.

These databases typically exist external to the interrogator. In fact, many of the databases may exist at diverse worldwide locations that are accessible through private networks or through the Internet. The signal processing that allows integration of these plurality of inputs may also be external to the interrogator wherein it provides metal sensing, RFID sensing and position information for external integrated processing. Then, the signal processing result may be provided for display to an integral user interface or to an external user interface associated with the interrogator. Thus, a control and processing subsystem of an interrogator may employ an adaptive integrating filter and coordinate a processing of a signal from a sensing subsystem in conjunction with the observables or the data as herein described to discern a presence of at least one of metal and RFID objects.

Figure 6A:
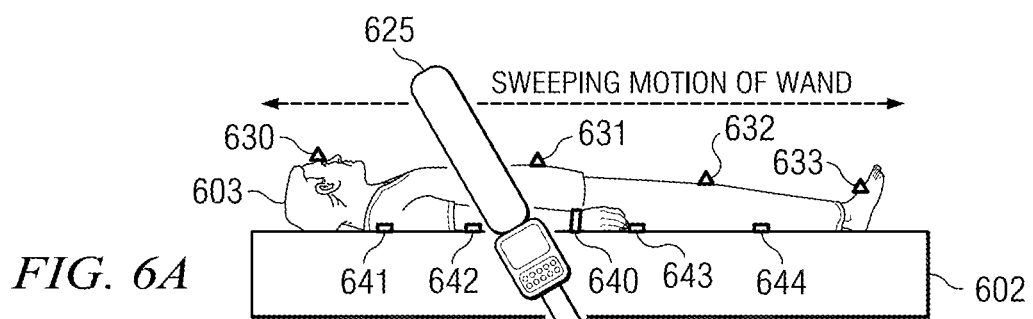
FIG. 6A illustrates a pictorial diagram of an embodiment of an interrogation system employable within an operating room of a medical facility and constructed in accordance with the principles of the present invention.

Turning now to FIG. 6A, illustrated is a pictorial diagram of an embodiment of an interrogation system, generally designated 600, employable within an operating room of a medical facility and constructed in accordance with the principles of the present invention. In the illustrated embodiment, the interrogation system 600 is employed within an operating room having an operating table 602 with a patient 603.

The interrogation system 600 includes a computer system 610 coupled to a database 611, a transceiver 615 that transmits and receives signals associated with the computer system 610 employing a transceiver antenna 616 and an interrogator (e.g., a portable interrogator) 625 employing an interrogator antenna 627. The interrogation system 600 also includes first, second, third and fourth RFID position markers 630, 631, 632, 633, (collectively referred to as RFID position markers 630-633), a RFID patient bracelet 640 attached to the patient 603 and first, second, third and fourth RFID/metal calibration markers 641, 642, 643, 644, (collectively referred to as RFID/metal calibration markers 641-644).

The RFID position markers 630-633 may be placed at predetermined locations on the patient 603. Generally, RFID position markers provide "position-unique" mapping of the patient 603 wherein the mapping may employ more or less RFID position markers than those shown in FIG. 6A. When used in conjunction with a sweeping motion of the portable interrogator 625, it may be possible to specifically identify the presence of a metal or a RFID tagged object as being located between two of the RFID position markers. Thus, a control and processing subsystem of the portable interrogator may employ multiscan, coherent signal processing to coordinate a processing of a plurality of signals (e.g., resulting from multiple scans) from a sensing subsystem to discern a presence of at least one of metal and RFID objects.

Additionally, employing an inertial position sensor in the portable interrogator 625 allows a more precise determination of the presence and location of a RFID or metal object between these two RFID position markers. In this instance, it may be possible to integrate sensor data across multiple sweeps of the portable interrogator 625 thereby increasing its sensitivity and quality of detection (e.g., by 30 times). Of course, any number of RFID position markers may be employed and positioned as appropriate to a particular situation.

The RFID/metal calibration markers 641-644 have unique RFID signatures and known amounts and types of metal. They are typically not placed on top of the patient 603, but are placed beneath or on the side of the patient 603, such as the underside of a leg or between an arm and the chest. As the portable interrogator 625 is swept over the patient 603, the RFID/metal calibration markers 641-644 are used to calibrate the type and sensitivity of interrogation needed by the portable interrogator 625 to provide an acceptable level of object identification thereby achieving an integrity of operation. Of course, any number of RFID/metal calibration markers may be employed and positioned as appropriate to a particular situation. Alternatively, calibration markers may be employed that use only RFID or only metal as appropriate to a particular application.

The RFID patient bracelet 640 contains specific information pertaining to the patient 603. The RFID patient bracelet 640 is read, either by the portable interrogator 625 or another appropriate device. The specific information may then be applied by the portable interrogator 625 or the computer system 610 for the purpose of further improving measurement sensitivity and quality. For example, ample interrogation for a seven year old female patient weighing 40 pounds may be quite different from that of a 50 year old male patient weighing 260 pounds. Identifying the patient 603 as well as employing specific databases and general information associated with the patient 603 allows for measurement quality and sensitivity improvements. The computer system 610 employing the database 611 may be employed in an integrated mode of operation or the portable interrogator 625 may operate autonomously.

Figure 6B:
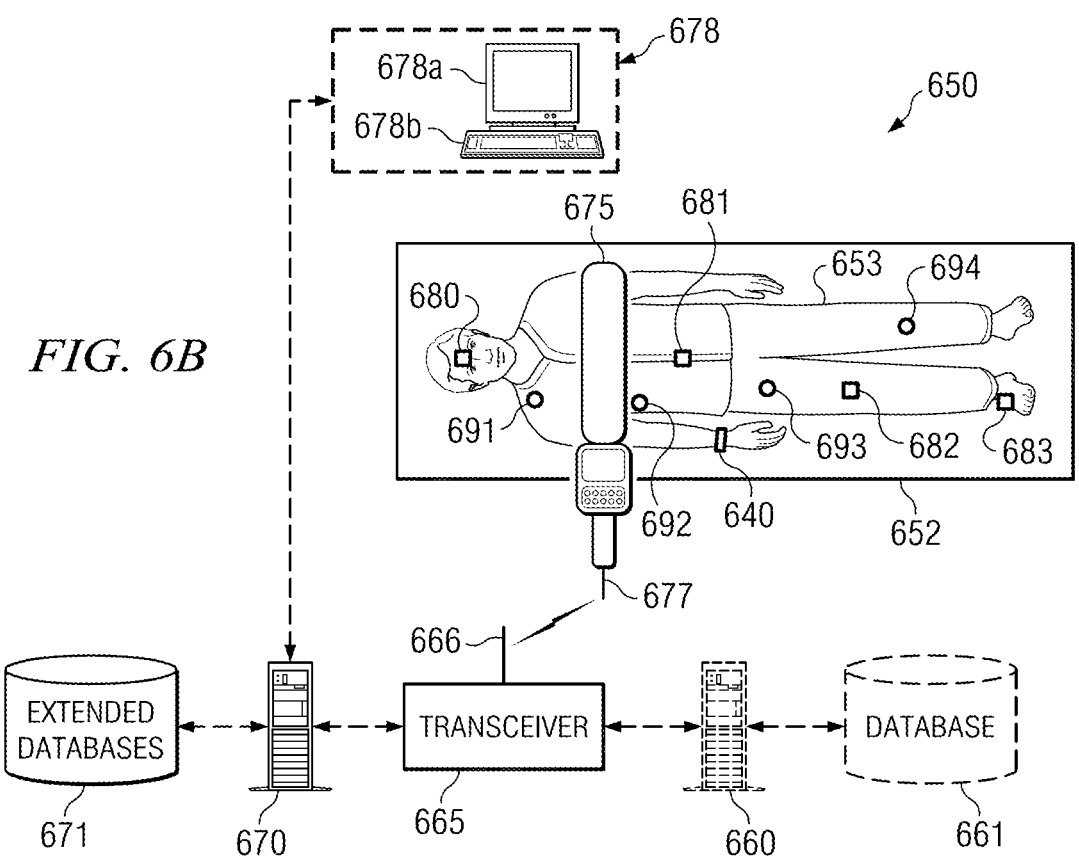
FIG. 6B illustrates a pictorial diagram of an alternative embodiment of an interrogation system employable within an operating room of a medical facility and constructed in accordance with the principles of the present invention.

Turning now to FIG. 6B, illustrated is a pictorial diagram of an alternative embodiment of an interrogation system, generally designated 650, employable within an operating room of a medical facility and constructed in accordance with the principles of the present invention. In the illustrated embodiment, the interrogation system 650 is employed within an operating room having an operating table 652 with a patient 653.

The interrogation system 650 includes a computer system 660 coupled to a database 661, a medical facility server 670 coupled to extended databases 671 and an external user interface 678 employing a monitor 678a and a keyboard 678b, a transceiver 665 employing a transceiver antenna 666 that transmits and receives signals associated with the computer system 660 and the medical facility server 670. The interrogation system 650 also includes an interrogator (e.g., a portable interrogator) 675 employing an interrogator antenna 677 that communicates with the transceiver 665, first, second, third and fourth RFID position markers 680, 681, 682, 683, a RFID patient bracelet 640 attached to the patient 653 and first, second, third and fourth calibration markers 691, 692, 693, 694.

As was discussed above, the database 661 and extended databases 671 may provide additional information and algorithms to be used as part of the interrogating process. Not only is patient-specific information available, but statistical information, relevant to patient types may also be available. This information may be employed for extensive signal processing within the medical facility server 670, or subsets of this information may be used for signal processing within the computer system 660 or the portable interrogator 675 itself. Additionally, the external user interface 678, an integral display associated with the portable interrogator 675 or both may be employed in the interrogating process.

Figure 7:
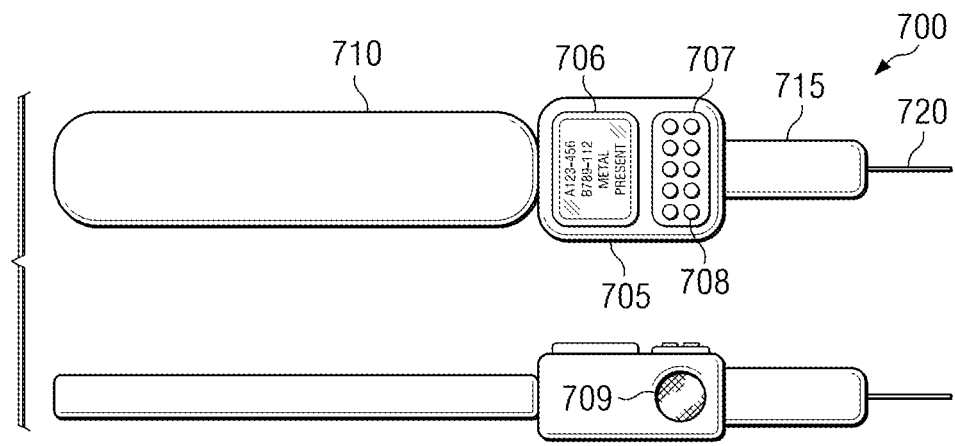
FIG. 7 illustrates a pictorial diagram of an embodiment of an interrogator constructed in accordance with the principles of the present invention.

Turning now to FIG. 7, illustrated is a pictorial diagram of an embodiment of an interrogator (e.g., a portable interrogator), generally designated 700, constructed in accordance with the principles of the present invention. The portable interrogator 700 includes an electronics housing 705 having a display 706, a touch pad 707 employing a collection of touch keys 708 and an audible alarm 709. The portable interrogator 700 also includes a sensing antenna assembly 710, a handle 715 and an interrogator antenna 720.

The sensing antenna assembly 710 contains RFID and metal sensing antennas and antenna interfaces that may be employed to sense RFID and metal objects associated with, for instance, a patient in a medical environment. The electronics housing 705 contains a metal sensing subsystem, a RFID sensing subsystem, a control and processing subsystem and a communications subsystem. The metal sensing subsystem and the RFID sensing subsystem accept RFID and metal antenna signals, respectively, and are coupled to the control and processing subsystem for signal processing that results in the detection of RFID and metal objects, when present. Again, the metal and RFID sensing subsystems may be integrated into a sensing subsystem. The control and processing subsystem is coupled to the communications subsystem, which employs the interrogator antenna 720 to communicate with external computer systems, databases and displays. The display 706, the touch pad 707 and the audible alarm 709 provide an integral user interface for the portable interrogator 700.

Figure 8A:
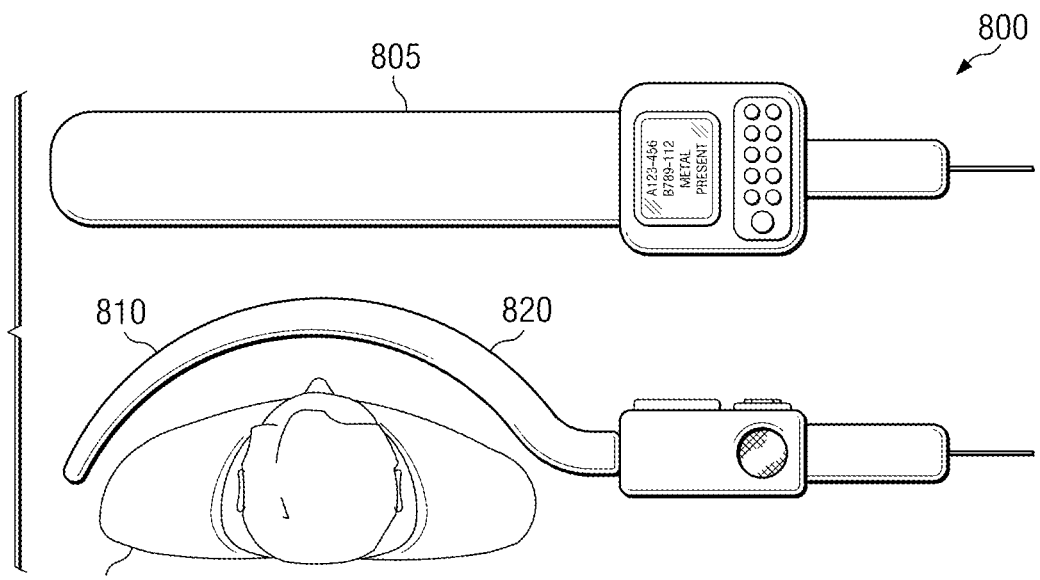
FIGS. 8A, 8B and 8C illustrate pictorial diagrams of alternative embodiments of interrogators constructed in accordance with the principles of the present invention.
Figure 8B:
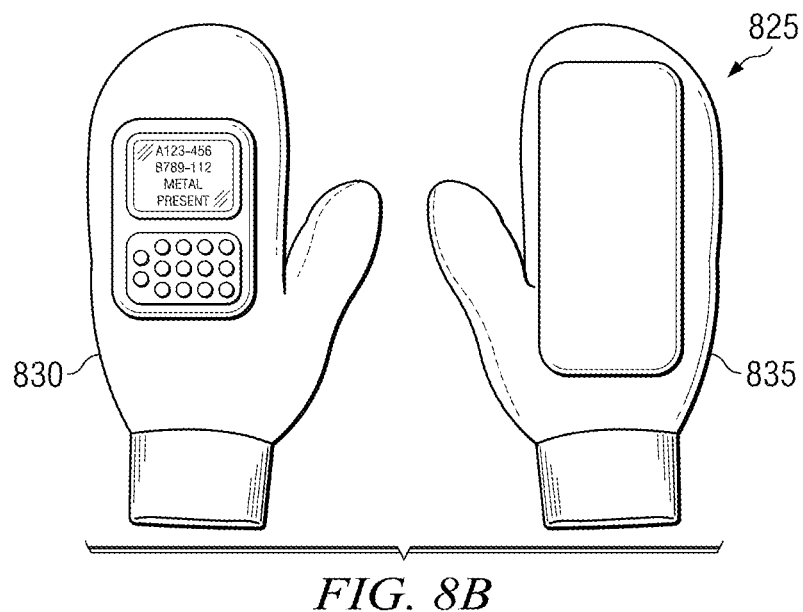
Figure 8C:
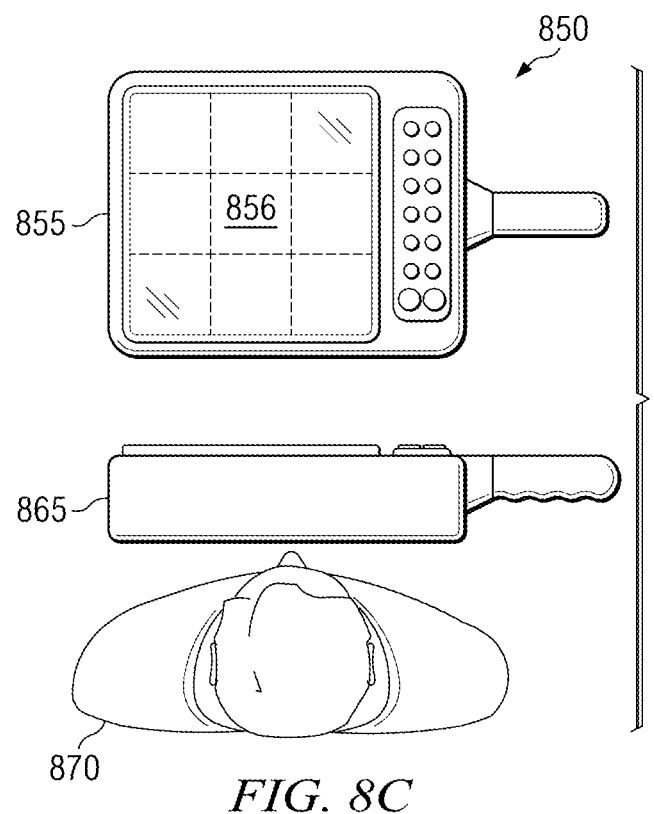

Turning now to FIGS. 8A, 8B and 8C, illustrated are pictorial diagrams of alternative embodiments of interrogators (e.g., portable interrogators), generally designated 800, 825 and 850, respectively, constructed in accordance with the principles of the present invention. FIG. 8A illustrates the portable interrogator 800 showing a top view 805 and a side view 810 positioned above, for instance, a patient 815.

In the illustrated embodiment, an antenna assembly 820 is configured to provide spatial information related to the location of RFID and metal objects located within or proximate the patient 815. This may be accomplished employing the direct geometry of the antenna assembly 820. The antenna assembly 820 is configured to contour the patient 815, as shown, and consists of multiple smaller antenna elements spaced contiguously within the antenna assembly 820 (not shown). In this way, a sensed RFID or metal object is also sensed by a specific antenna element within the antenna assembly 820. The location of that specific antenna element provides information relative to a corresponding location on the patient 815. The illustrated embodiment of FIG. 8A depicts a general design concept of the invention and other embodiments employing these concepts are also possible.

FIG. 8B illustrates an embodiment of a portable interrogator 825, which is configured to be a mitten that may be worn, for instance, on a health care individual's hand. FIG. 8B includes a top view 830 and a side view 835 of the portable interrogator 825. Employing this mitten-like embodiment, the health care individual may move his/her hand over the patient to obtain specific locations of metal and RFID tagged objects based on the location of his/her hand. FIG. 8B is intended to illustrate the concept of incorporating a portable interrogator into a glove or mitten-like configuration, and of course, other embodiments employing this basic concept are also well within the scope of the present invention.

FIG. 8C illustrates a portable interrogator 850 showing a top view 855 and a side view 865 positioned above, for instance, a patient 870. The top view 855 illustrates an expanded display 856 employing a relatively large "paddle-like" configuration. The illustrated embodiment consists of an antenna assembly having an array of antenna elements on the patient-side and a corresponding expanded display capability on the user-side. The expanded display capability consists of a display grid, which conforms to the antenna elements in a one-to-one manner An object sensed through a specific antenna element of the antenna assembly causes a sensed output to occur on its specific and corresponding portion of the expanded display.

This embodiment provides additional spatial information of the detected objects with respect to the patient. The illustrated embodiment depicts a means of mapping specific antenna elements to a corresponding display. Of course, other embodiments employing this principle of having a one-to-one mapping of antenna elements and displays are well within the broad scope of the present invention. Also, while the interrogators have been described in relation to a medical environment, one skilled in the art should understand that the interrogator may be employed in other environments and still be within the broad scope of the present invention.

Figure 9:
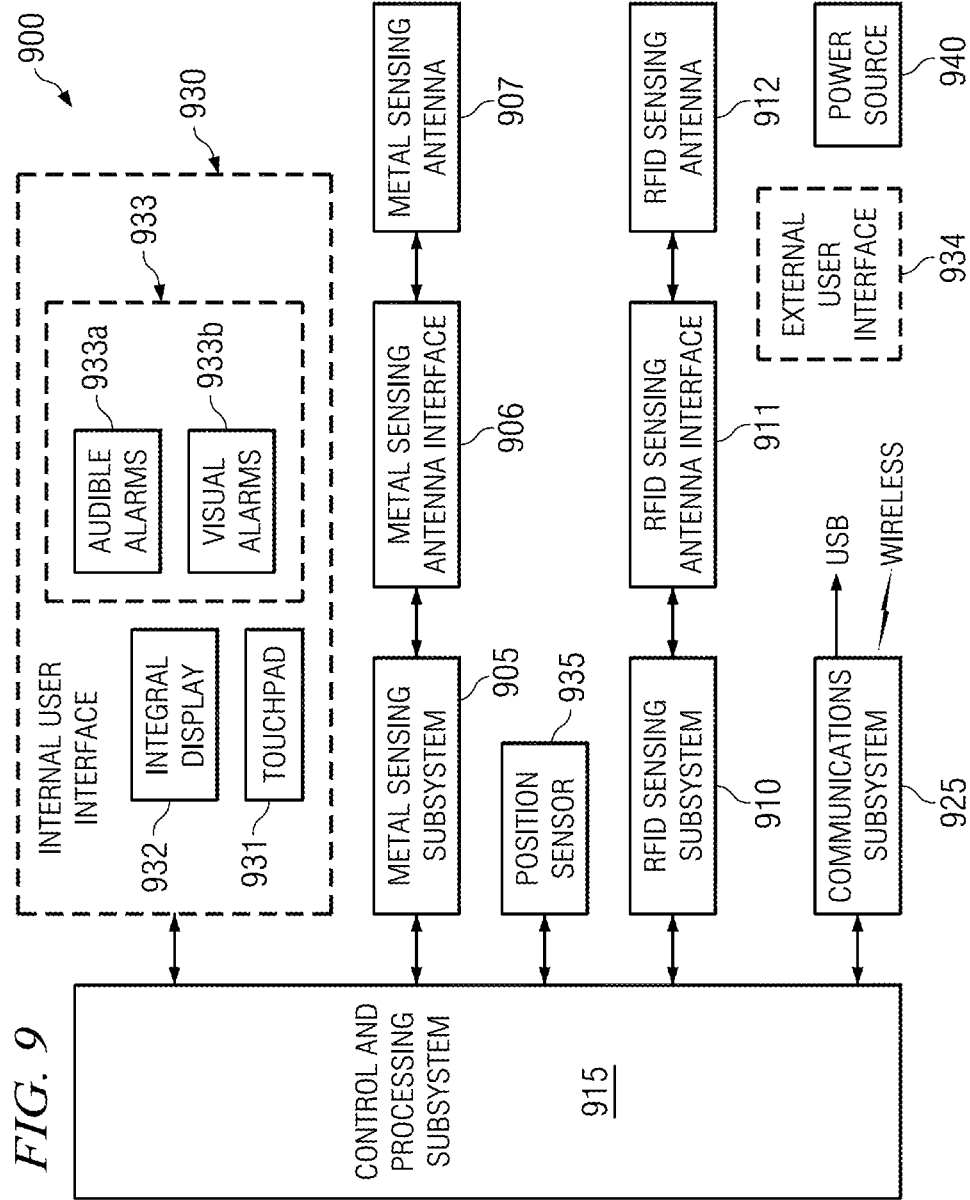
FIG. 9 illustrates a system diagram of an embodiment of an interrogator constructed in accordance with the principles of the present invention.

Turning now to FIG. 9, illustrated is a system diagram of an embodiment of an interrogator, generally designated 900, constructed in accordance with the principles of the present invention. The interrogator 900 includes a metal sensing subsystem 905, a metal sensing antenna interface 906, a metal sensing antenna 907, a RFID sensing subsystem 910, a RFID sensing antenna interface 911, a RFID sensing antenna 912, a control and processing subsystem 915, a communications subsystem 925, an internal user interface 930, a position sensor 935 and a power source 940.

In the illustrated embodiment, the internal user interface 930 includes a touchpad 931, an integral display 932 and an alarm 933, which may include both an audible alert 933a and a visual alert 933b. Additionally, the interrogator 900 employs an external user interface 934, coupled through the communications subsystem 925, as shown. The external user interface 934 may employ substantially similar elements as the internal user interface 930. However, the display and touchpad elements may be larger and more extensive in capability.

The metal sensing subsystem 905 is coupled to the metal sensing antenna interface 906 and the metal sensing antenna 907 and is configured to provide a first signal having a signature representing a presence of a metal object. The RFID sensing subsystem 910 is coupled to the RFID sensing antenna interface 911 and the RFID sensing antenna 912 and is configured to provide a second signal having a signature representing a presence of a RFID object. The control and processing subsystem 915 is coupled to the metal sensing subsystem 905 and the RFID sensing subsystem 910 and is configured to discern a presence of at least one of the metal and RFID objects from one of the first and second signals.

The control and processing subsystem 915 coordinates an operation of the metal sensing subsystem 905 and the RFID sensing subsystem 910. Additionally, the control and processing subsystem 915 analyzes the first signal for a metal object signature and the second signal for a RFID object signature. The metal object signature typically may be created by a change or distortion in a field associated with the metal sensing subsystem 905. The RFID object signature typically may be created as an identification data sequence associated with a RFID object. Analysis of the first and second signals may employ signature parameters based on factors such as a size, a shape, an orientation, likelihood, a position or a depth associated with the metal object or the RFID object. Additionally, the analysis may employ data associated with metal and RFID objects that is internally or externally stored.

The control and processing subsystem 915 is also coupled to the communications subsystem 925, the internal user interface 930 and the position sensor 935. The position sensor 935 may typically be of an inertial type and may provide either two dimensional (2D) or three dimensional (3D) information as to the position of the interrogator 900 for the purpose of aiding metal or RFID tag detection. In the illustrated embodiment, the communications subsystem 925 employs transmit and receive circuitry coupled to an antenna to exchange data with an external transceiver.

For example, the communications subsystem 925 may be employed to send metal and RFID signature information to an external server for a more extensive analysis that may be beyond the capability of the control and processing subsystem 915. The results of the analysis may be returned through the communications subsystem 925 for final disposition by the control and processing subsystem 915. Alternatively, the control and processing subsystem 915 may employ the communications subsystem 925 to sequentially query external databases for signature profiles or analysis algorithms to be applied locally by the control and processing subsystem 915.

The internal user interface 930 allows a user to interact with the interrogator 900 to provide input and receive output associated with its application. The position sensor 935 cooperates with the control and processing subsystem 915 to allow a position of the integrator 900 to be determined. The power source 940 employs a rechargeable or replaceable battery and provides necessary operating supply voltages to the interrogator 900.

The user of the interrogator 900 may employ the touchpad 931 to select a mode of operation or both enter and request information about a specific metal or RFID object. The integral display 932 may be employed to show a RFID number or indicate that the interrogator 900 is detecting the presence of a metal or RFID object. Alternatively, the external display 934 may be employed to indicate the presence of a metal or RFID object. Additionally, the integral display 932 or the external display 934 may be employed in conjunction with the position sensor 935 to determine a profile and a position of the metal or RFID object with respect to a movement or sweeping motion of the interrogator 900. The audible alert 933a may include distinctive tones or synthesized voice communications. The visual alert 933b may be flashing or colored features that include textual or graphical representations. The visual alert 933b may be associated with the integral display 932, the external display 934, or they may be stand-alone.

Figure 10:
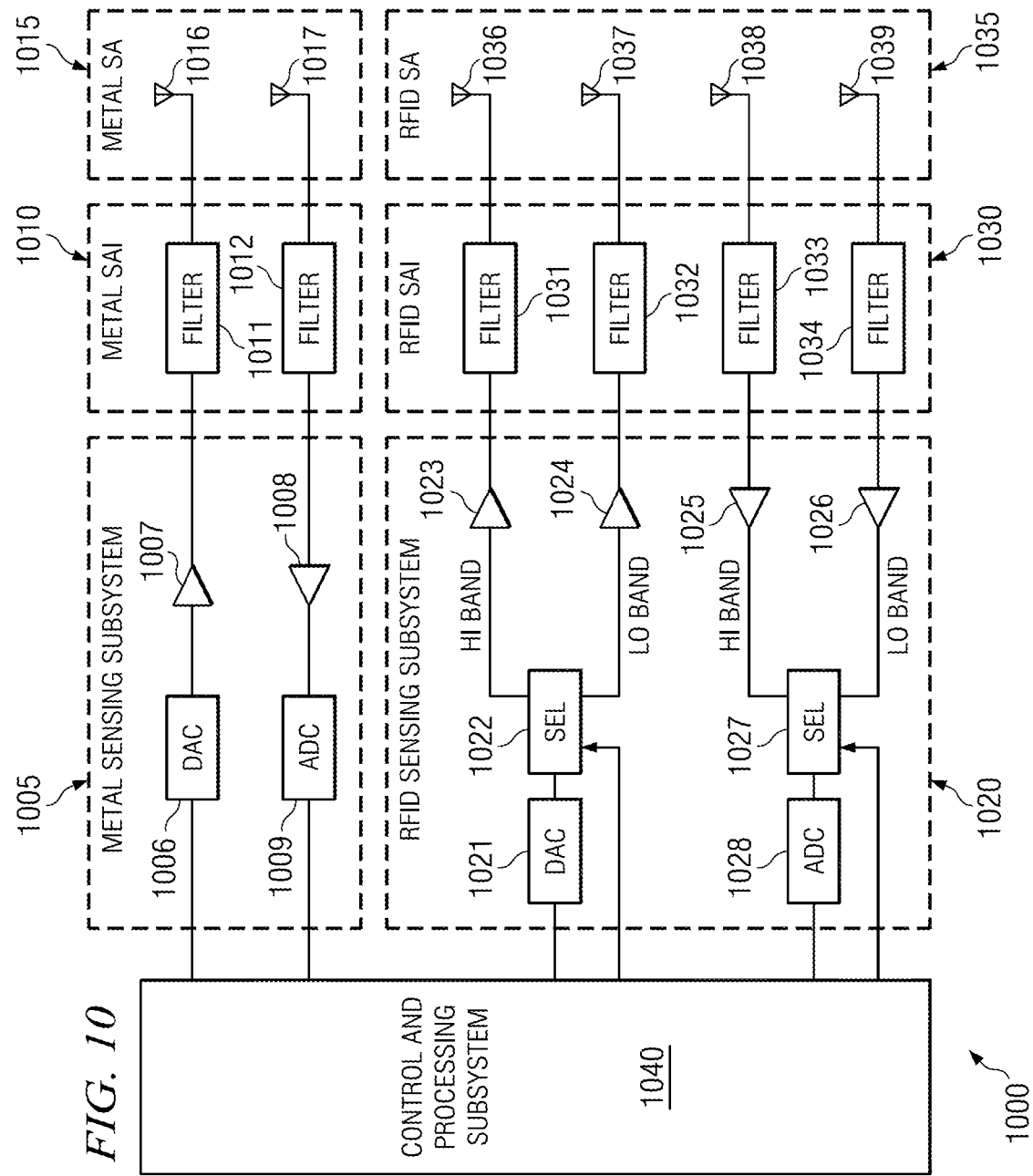
FIG. 10 illustrates a block diagram of another embodiment of an interrogator constructed in accordance with the principles of the present invention.

Turning now to FIG. 10, illustrated is a block diagram of another embodiment of an interrogator, generally designated 1000, constructed in accordance with the principles of the present invention. The interrogator 1000 includes a metal sensing subsystem 1005, a metal sensing antenna interface 1010, a metal sensing antenna 1015, a RFID sensing subsystem 1020, a RFID sensing antenna interface 1030, a RFID sensing antenna 1035 and a control and processing subsystem 1040.

The metal sensing subsystem 1005 includes a metal sensing digital-to-analog converter (DAC) 1006, a metal sensing transmit amplifier 1007, a metal sensing receive amplifier 1008 and a metal sensing analog-to-digital converter (ADC) 1009. The metal sensing antenna interface 1010 includes a metal sensing transmit conditioning filter 1011 and a metal sensing receive conditioning filter 1012. The metal sensing antenna 1015 includes a metal sensing transmit antenna 1016 and a metal sensing receive antenna 1017.

The RFID sensing subsystem 1020 includes a RFID sensing DAC 1021, a RFID sensing transmit selector switch 1022, a first RFID sensing transmit amplifier 1023, a second RFID sensing transmit amplifier 1024, a first RFID sensing receive amplifier 1025, a second RFID sensing receive amplifier 1026, a RFID sensing receive selector switch 1027 and a RFID sensing ADC 1028. The RFID sensing antenna interface 1030 includes first and second RFID sensing transmit conditioning filters 1031, 1032 and first and second RFID sensing receive conditioning filters 1033, 1034. The RFID sensing antenna 1035 includes first and second RFID sensing transmit antennas 1036, 1037 and first and second RFID sensing receive antennas 1038, 1039. "HI band" and "LO band" capabilities are present to accommodate the wide frequency range necessary to detect the various types of RFID tags.

In an alternative embodiment, a mixing or heterodyning function may be included within the RFID sensing ADC 1028 or the RFID sensing DAC 1021 functions. These techniques are known to those skilled in the pertinent art and may be employed to translate signal processing to a more desirable frequency range thereby allowing less expensive or more readily available components to be used. Additionally, the specific nature and function of the first and second transmit conditioning filters 1031, 1032 and first and second RFID sensing receive conditioning filters 1033, 1034 may vary depending on the specific algorithms employed for control and processing and for signal generation and recovery. Also, some embodiments may not require some or all of the filters shown.

In the illustrated embodiment, the control and processing subsystem 1040 may be a software defined structure that allows features and functions of the interrogator 1000 to be easily modified or tailored by altering software functions. The control and processing subsystem 1040 employs a crystal oscillator to provide a precise frequency reference for both the metal and RFID sensing subsystems 1005, 1020. Operation of the control and processing subsystem 1040 will be more fully discussed with respect to FIG. 13, below.

The control and processing subsystem 1040 generates a metal sensing digital excitation signal based on a metal sensing mode of operation selected and provides this signal to the metal sensing DAC 1006. The metal sensing digital excitation signal may be in the form of a continuous tone. Alternatively, the digital excitation signal may vary in amplitude, frequency, or phase and may also be of a pulsed nature wherein the waveform duty cycle is less than 100 percent. The frequency of the metal sensing digital excitation signal may generally be in the range of five to 100 kHz. Different waveforms may be used to optimize a detection of both ferrous and non-ferrous metals. These waveforms may be selected for different sizes and masses of metals and for metals at different locations and depths within a patient. Algorithmic information employed in generating these excitation signals may be part of the control and processing subsystem 1040.

The metal sensing DAC 1006 converts the metal sensing digital excitation signal into an analog signal that, except for its amplitude, is the metal sensing transmit signal. The analog signal is provided to the metal sensing transmit amplifier 1007, which amplifies the analog signal to a correct amplitude for transmission. The output of the metal sensing transmit amplifier 1007 is provided to the metal sensing transmit conditioning filter 1011, which sufficiently attenuates all out-of-band signals and provides a proper impedance match to the metal sensing transmit antenna 1016. The metal sensing transmit antenna 1016 launches the metal sensing transmit signal.

A metal object present in the vicinity of the metal sensing transmit antenna 1016 and the metal sensing transmit signal will generate a metal sensing return signal wherein the metal sensing return signal may be based on a change in a field characteristic of the metal sensing transmit signal. The field characteristic may be altered in the vicinity of the metal object such that a distinctive metal sensing receive signal impinges on and excites the metal sensing receive antenna 1017. The output of the metal sensing receive antenna 1017 is provided to the metal sensing receive conditioning filter 1012, which sufficiently attenuates all out-of-band energy and provides a proper impedance match between the metal sensing receive antenna 1017 and the metal sensing receive amplifier 1008.

The metal sensing receive amplifier 1008 amplifies the metal sensing receive signal to a level sufficient for processing and provides it to the metal sensing ADC 1009. The metal sensing ADC 1009 provides a metal sensing digital signal, proportional to the metal sensing receive signal, to the control and processing subsystem 1040, which determines if the metal sensing digital signal has a signature representing a presence of a metal object in the vicinity of the metal sensing antenna 1015.

The control and processing subsystem 1040 generates a RFID sensing digital excitation signal based on a RFID mode of operation selected and outputs this signal to the RFID sensing DAC 1021. The RFID sensing digital excitation signal may be in the form of a code that excites and energizes a RFID object present such as a RFID tag. The carrier frequency associated with this code may be in one of two frequency bands. A first frequency band may be centered around 133-135 kHz and is designated as the "LO band". A second frequency band may be centered around 10-13 MHZ and is designated the "HI band". Alternatively, a "HI band" around 902-928 MHZ may also be employed. Alternatively, the 133-135 kHz and the 10-13 MHZ bands may be combined in the "LO band" and some specific implementations may require only a single band. A frequency band is selected based on the RFID mode of operation selected. Each frequency band corresponds to different types of RFID tags present, which may be based on its size or other factors. Generally, algorithmic information to generate the RFID sensing digital excitation signal is contained in the control and processing subsystem 1040.

The RFID sensing DAC 1021 converts the RFID sensing digital excitation signal into an analog signal that, except for amplitude, is the RFID sensing transmit signal. The RFID sensing transmit signal is provided to the RFID sensing transmit selector switch 1022, which is controlled by the control and processing subsystem 1040. The RFID sensing transmit selector switch 1022 directs the RFID sensing transmit signal to the first RFID sensing transmit amplifier 1023 or the second RFID sensing transmit amplifier 1024, respectively, based on whether the RFID sensing transmit signal is "HI band" or "LO band." The first RFID sensing transmit amplifier 1023 and the second RFID sensing transmit amplifier 1024 increase the amplitude of the "HI band" and "LO band" signals to a correct amplitude for transmission.

The first RFID sensing transmit amplifier 1023 provides the "HI band" signal to the first RFID sensing transmit conditioning filter 1031 and the second RFID sensing transmit amplifier 1024 provides the "LO band" signal to the second RFID sensing transmit conditioning filter 1032. The first and second RFID sensing transmit conditioning filters 1031, 1032 employ differing center frequencies and sufficiently attenuate associated out-of-band signals. Additionally, they provide a proper impedance match to their respective first or second RFID sensing transmit antennas 1036, 1037, which launch their respective RFID sensing transmit signals.

A RFID object, such as a RFID tag, in the vicinity of the first or second RFID sensing transmit antenna 1036, 1037 generates a RFID sensing return signal. The RFID sensing return signal impinges on and excites the appropriate first or second RFID sensing receive antenna 1038, 1039, respectively, to provide a RFID sensing receive signal. An output of the first or second RFID sensing receive antenna 1038, 1039 is provided to the first or second RFID receive conditioning filter 1033, 1034, respectively. The first or second RFID receive conditioning filter 1033, 1034 sufficiently attenuates the out-of-band energy and provides a proper impedance match between the first or second RFID sensing receive antenna 1038, 1039 and the first or second RFID sensing receive amplifier 1025, 1026, respectively.

The first or second RFID sensing receive amplifier 1025, 1026 amplifies the small RFID sensing receive signal to a level sufficient for processing and provides an amplified RFID sensing receive signal to the RFID sensing receive selector switch 1027, which is controlled by the control and processing subsystem 1040. The control and processing subsystem 1040 selects the appropriate reception path through the RFID sensing receive selector switch 1027 for input to the RFID sensing ADC 1028, based on the excitation signal transmitted. The RFID sensing ADC 1028 provides a RFID sensing digital signal, proportional to the RFID sensing receive signal, to the control and processing subsystem 1040, which determines if the RFID sensing receive signal has a signature representing a presence of a RFID object in the vicinity of the RFID sensing antenna 1035.

Figure 11:
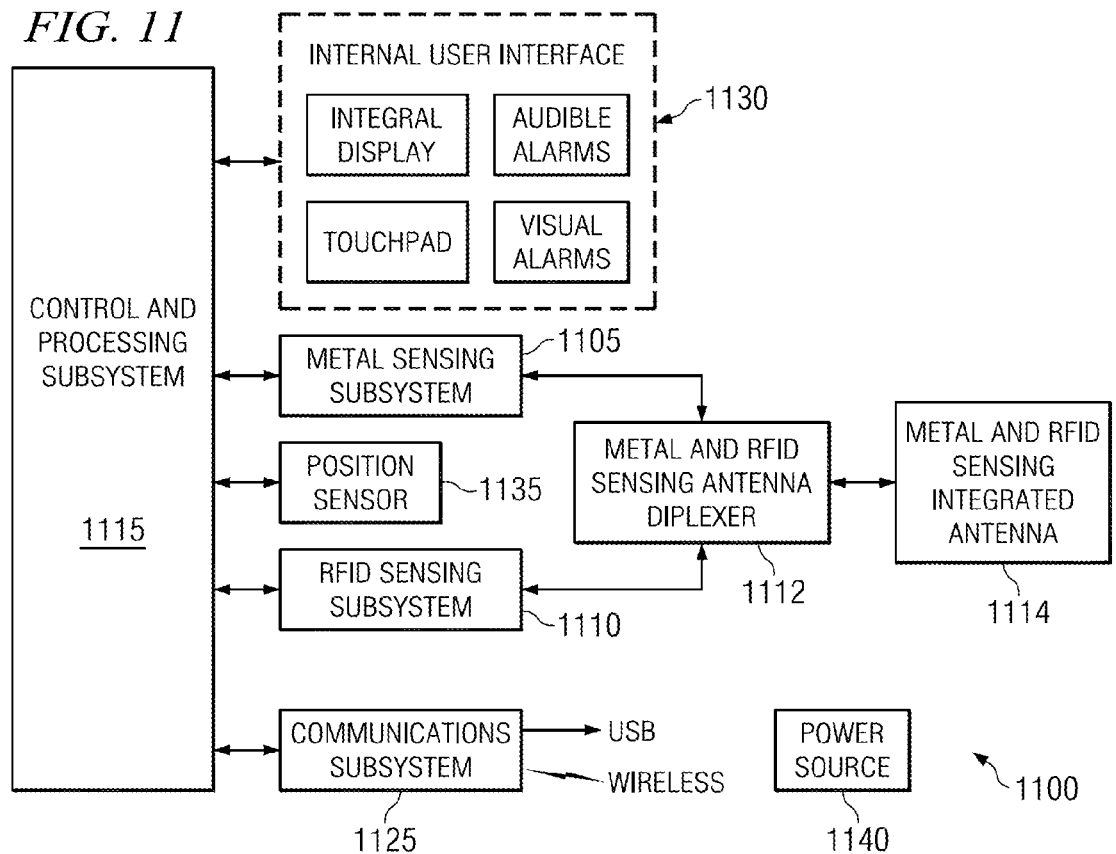
FIG. 11 illustrates a system diagram of an alternative embodiment of an interrogator constructed in accordance with the principles of the present invention.

Turning now to FIG. 11, illustrated is a system diagram of an alternative embodiment of an interrogator, generally designated 1100, constructed in accordance with the principles of the present invention. The interrogator 1100 includes a metal sensing subsystem 1105, a RFID sensing subsystem 1110, a metal and RFID sensing antenna diplexer 1112, a metal and RFID sensing integrated antenna 1114, a control and processing subsystem 1115, a communications subsystem 1125, a user interface 1130, a position sensor 1135 and a power source 1140.

The interrogator 1100 is similar to the interrogator 900 of FIG. 9 wherein the metal and RFID sensing antenna diplexer 1112 has replaced the metal sensing antenna interface 906 and the RFID sensing antenna interface 911. Additionally, the metal and RFID sensing integrated antenna 1114 has replaced the metal sensing antenna 907 and the RFID sensing antenna 912. General operation of the interrogator 1100 is also similar to the operation of the interrogator 900 of FIG. 9.

However, the interrogator 1100 employs the metal and RFID sensing antenna diplexer 1112 between the transmit and receive paths associated with both the metal sensing and RFID sensing subsystems 1105, 1110. The metal and RFID sensing antenna diplexer 1112 accommodates the frequency selecting and impedance matching functions. Similarly, the metal and RFID sensing integrated antenna 1114 is also employed in both the transmit and receive paths associated with both the metal sensing and RFID sensing subsystems 1105, 1110. A more detailed discussion of the metal and RFID sensing antenna diplexer 1112 and the metal and RFID sensing integrated antenna 1114 are presented below with respect to FIG. 12.

Figure 12:
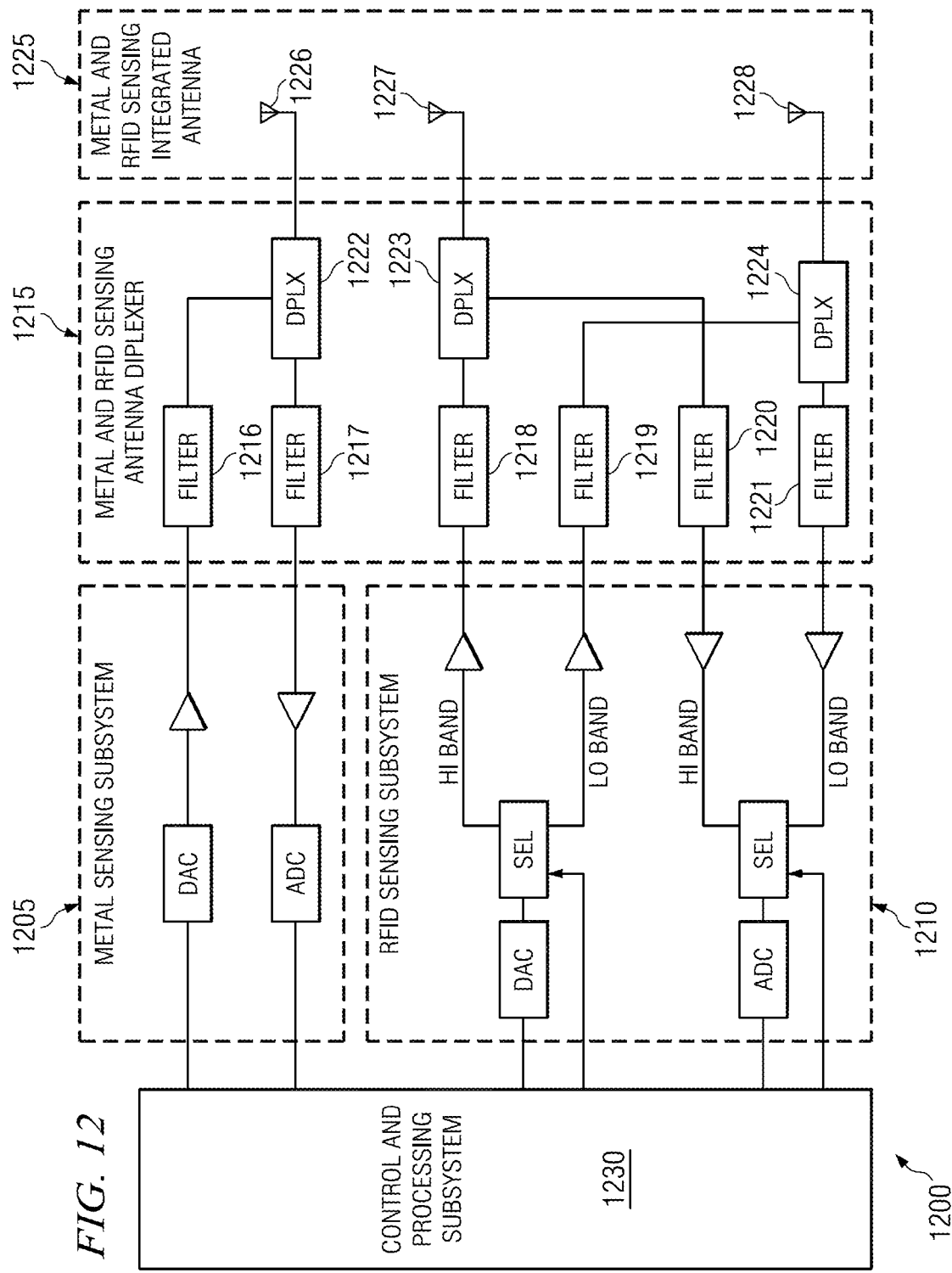
FIG. 12 illustrates a block diagram of another embodiment of an interrogator constructed in accordance with the principles of the present invention.

Turning now to FIG. 12, illustrated is a block diagram of another embodiment of an interrogator, generally designated 1200, constructed in accordance with the principles of the present invention. The interrogator 1200 includes a metal sensing subsystem 1205, a RFID sensing subsystem 1210, a metal and RFID sensing antenna diplexer 1215, a metal and RFID sensing integrated antenna 1225 and a control and processing subsystem 1230.

The metal and RFID sensing antenna diplexer 1215 includes a metal sensing transmit conditioning filter 1216, a metal sensing receive conditioning filter 1217, a metal sensing diplexer switch 1222, first and second RFID sensing transmit conditioning filters 1218, 1219, first and second RFID sensing receive conditioning filters 1220, 1221 and first and second RFID sensing diplexer switches 1223, 1224. The metal and RFID sensing integrated antenna 1225 includes a metal sensing transmit/receive antenna 1226 and first and second RFID sensing transmit/receive antennas 1227, 1228.

Operation of the metal sensing subsystem 1205, the RFID sensing subsystem 1210 and the control and processing subsystem 1230 are analogous to the metal sensing subsystem 1005, the RFID sensing subsystem 1020 and the control and processing subsystem 1040 as was discussed with respect the interrogator 1000 of FIG. 10. Alternatively, the metal and RFID sensing subsystems 1205, 1210 may be integrated into a sensing subsystem that provides a signal or a plurality of signals having at least one of a metal signature representing a presence of a metal object and a RFID signature representing a presence of a RFID object.

However, the interrogator 1200 employs the metal and RFID sensing integrated antenna 1225, which shares a common antenna between associated transmit and receive signals. For example, the metal sensing transmit/receive antenna 1226 is coupled to both the metal sensing transmit conditioning filter 1216 and the metal sensing receive conditioning filter 1217 via the metal sensing diplexer switch 1222. Similarly, the first and second RFID sensing transmit/receive antennas 1225, 1228 are coupled through the first and second RFID sensing diplexer switches 1223, 1224 to their corresponding RFID sensing conditioning filters.

Generally, the diplexer switches are configured as conventional three-port devices so as to provide low loss paths for excitation signals proceeding from the transmit amplifiers to the antennas and correspondingly to provide low loss paths for incoming signals from the antennas to the receiving amplifiers. In time domain configurations, these may be accomplished by simple switching or gating. In continuous mode configurations, this may be accomplished by properly phasing signals so that they are in-phase when traveling to a desired port and out-of-phase when traveling to an undesired port.

The metal and RFID sensing integrated antenna 1225 provides a suitable match to both launch a transmit signal and accept a receive signal associated with the metal and RFID sensing functions. The individual antennas may consist of single elements or may themselves be complex in nature with multiple elements. The antennas may be partially shielded so as to inhibit transmitted and received radiation to and from unwanted directions. For example, an antenna being passed over a patient or portion of the operating room such as a back table or MAYO stand, should ideally have maximum sensitivity in the direction and vicinity of the patient and maximum attenuation in all other directions.

Figure 13:
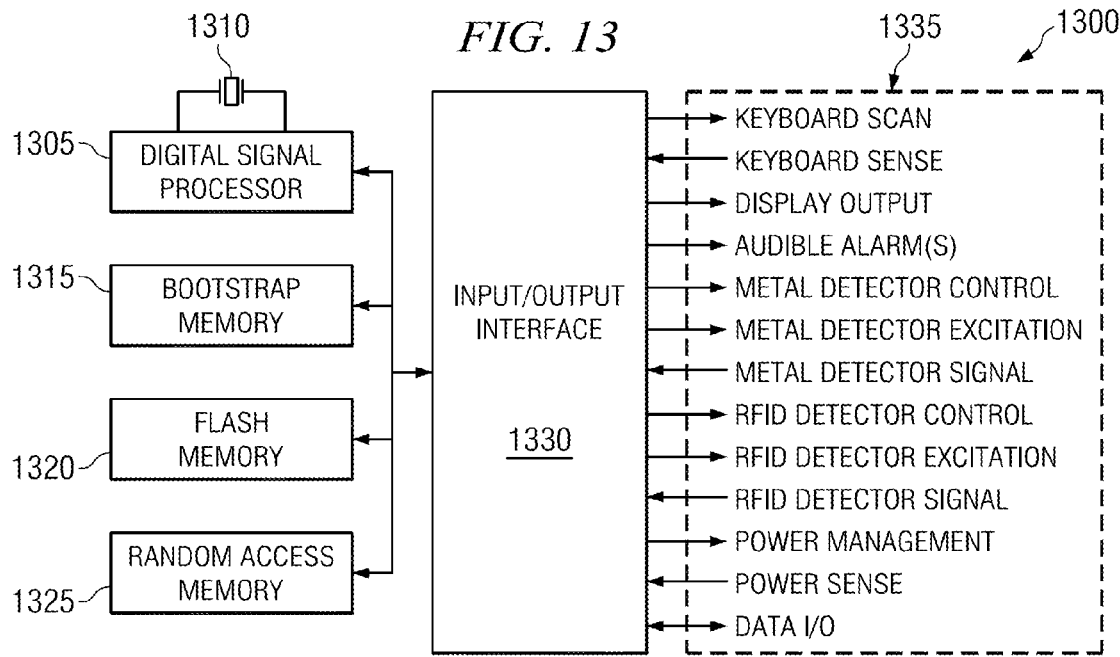
FIG. 13 illustrates a block diagram of an embodiment of a control and processing subsystem constructed in accordance with the principles of the present invention.

Turning now to FIG. 13, illustrated is a block diagram of an embodiment of a control and processing subsystem, generally designated 1300, constructed in accordance with the principles of the present invention. The control and processing subsystem 1300 includes a digital signal processor 1305 employing a frequency control crystal 1310, a bootstrap memory 1315, a flash memory 1320, a random access memory 1325, and an input/output interface 1330.

The control and processing subsystem 1300 provides the digital signal processing functions, the signal generating functions, the control functions and the input and output interface functions associated with an interrogator. The digital signal processor 1305 may be embodied as a single integrated circuit, or as a group of integrated circuits performing this role. All transmit signals are generated within the digital signal processor 1305 which also includes a signal synthesizing function. The frequency control crystal 1310 provides proper timing for the signal synthesizing function.

The bootstrap memory 1315 is a non-volatile read-only memory that contains a basic software program to enable the interrogator to power up, accept commands from the keyboard, display diagnostics, and allow data ports to be used. In the case of a software-related system failure, the bootstrap system 1315 allows the interrogator to recover (i.e., reboot). It also possesses basic system diagnostics which may be run independently of whatever software has been loaded.

The flash memory 1320 is a non-volatile random access memory, where the current operating system and program of the interrogator is loaded. The contents of the flash memory 1320 may be changed, updated and checked by diagnostics and programs contained in The bootstrap memory 1315. For example, diagnostics exist within the bootstrap memory 1315 to test the random access memory 1325. The input/output interface 1330 is a portion of the control and processing subsystem 1300 that accesses all other necessary portions as well as external ports of the interrogator, wherein the collection of interface connections 1335 may be considered typical.

The data I/O port of the collection of interface connections 1335 allows specific software releases or upgrades to be loaded into an interrogator, either wirelessly or using a wireline. In this manner, the characteristics of the interrogator may be easily changed or upgraded as necessary or appropriate. The software defined architecture enables this capability since all signal processing decisions and signal generation initiation occurs within the control and processing subsystem 1300.

Similarly, this architecture permits upgrading of existing algorithms and incorporation of new algorithms for existing RFID tag and metal detection without hardware modifications. Therefore, the interrogator may be employed as substantially a universal interrogator that is capable of adaptation to read multiple versions of RFID tags from various manufacturers, including future-developed RFID tags. Of course, this may also include metal detection improvements and additions, as well.

Although the embodiments this invention presented have concentrated on the detection and monitoring of disposable and non-disposable medical equipment, alternative embodiments and future applications outside the medical field are envisioned. These applications include integrating the detection of multiple disparate objects within a single system and the integration of disparate observables into a single integrating filter. Also included are the real-time integration of observables with multiple databases, and the real-time offloading of portions of the signal processing from the interrogator.

Alternative embodiments may include added detection range, increased detection sensitivity in hostile environments, increased detection integrity, real-time versatility in dynamically selecting what is to be detected, and simultaneous universal detection of multiple types of RFID tags and metallic objects, often operating at disparate frequencies. These applications and embodiments may encompass, for example, inventory management, supply chain management, and security.

In summary, embodiments of the present invention employing an interrogator, a method of discerning a presence of at least one of a metal and a RFID object, and an interrogation system employing the same have been presented. The interrogator and the interrogation system may be operated in either an autonomous mode or an integrated mode. In the autonomous mode of operation, the control and processing subsystem autonomously accomplishes the operation of the interrogator by providing analysis algorithms and performing functions needed to discern the presence of metal and RFID objects. Alternatively, the integrated mode of operation may employ a computer system, either wirelessly or through a wired interface, to support the control and processing subsystem in discerning the presence of metal and RFID objects. It also may employ the integration of additional sensors such as inertial sensors. The integrated mode of operation typically allows a more extensive utilization of databases and algorithms to be employed than in the autonomous mode of operation.

Although the present invention has been described in detail, those skilled in the art should understand that they can make various changes, substitutions and alterations herein without departing from the spirit and scope of the invention in its broadest form.

What is claimed is:

1. An interrogator, comprising:
   an antenna configured to receive a first signal and a second signal from a first object and a second object, respectively, in close unobstructed proximity; and
   a control and processing subsystem configured to discern a presence of said first object and said second object from said first signal and said second signal, respectively, as said antenna moves with respect to said first object and said second object.

2. The interrogator as recited in claim 1 further comprising a position sensor configured to cooperate with said control and processing subsystem to provide a location of said first object and said second object in accordance with at least one position marker.

3. The interrogator as recited in claim 1 further comprising a sensing subsystem configured to provide said first signal and said second signal having a signature representing said first object and said second object, respectively, from said antenna to said control and processing subsystem.

4. The interrogator as recited in claim 3 wherein said first object is a first radio frequency identification (RFID) object, said second object is a second RFID object and said sensing subsystem includes a RFID sensing subsystem configured to provide said first signal and said second signal having a signature representing said first RFID object and said second RFID object, respectively, to said control and processing subsystem to discern a presence of said first RFID object and said second RFID object therefrom without a radio frequency shield therebetween.

5. The interrogator as recited in claim 3 wherein said first object is a first metal object, said second object is a second metal object and said sensing subsystem includes a metal sensing subsystem configured to provide said first signal and said second signal having a signature representing said first metal object and said second metal object, respectively, to said control and processing subsystem to discern a presence of said first metal object and said second metal object therefrom without a metal shield therebetween.

6. The interrogator as recited in claim 1 wherein said control and processing subsystem is configured to employ multiscan, coherent signal processing.

7. The interrogator as recited in claim 1 wherein said control and processing subsystem includes an adaptive integrating filter and is configured to coordinate a processing of said first signal and said second signal in conjunction with one of an observable and data to discern said presence of said first object and said second object.

8. The interrogator as recited in claim 1 wherein said first object and said second object are proximate a person having a bracelet including information about said person.

9. The interrogator as recited in claim 1 wherein said first object and said second object are proximate a person and at least one calibration marker is located about said person configured to calibrate a type and sensitivity of an interrogation associated with said interrogator.

10. The interrogator as recited in claim 1 further comprising a user interface.

11. The interrogator as recited in claim 10 wherein said user interface comprises a touchpad, display and alarms.

12. The interrogator as recited in claim 1 further comprising a communications subsystem configured to exchange data with an external server.

13. The interrogator as recited in claim 1 further comprising a power source.

14. The interrogator as recited in claim 1 further comprising a transmit antenna configured to transmit an interrogation signal to said first object and said second object.

15. The interrogator as recited in claim 1 further comprising another antenna tuned to a different frequency than said antenna.

16. The interrogator as recited in claim 1 wherein said control and processing subsystem is configured to provide a location of said first object and said second object.

17. A method of operating an interrogator, comprising:
   receiving a first signal and a second signal from a first object and a second object, respectively, in close unobstructed proximity at an antenna; and
   discerning a presence of said first object and said second object with a control and processing subsystem from said first signal and said second signal, respectively, as said antenna moves with respect to said first object and said second object.

18. The method as recited in claim 17 further comprising providing a location of said first object and said second object with a position sensor cooperating with said control and processing subsystem and in accordance with at least one position marker.

19. The method as recited in claim 17 further comprising coordinating a processing of said first signal and said second signal in conjunction with one of an observable and data to discern said presence of said first object and said second object.

20. The method as recited in claim 17 wherein said first object and said second object are proximate a person and further comprising calibrating a type and sensitivity of an interrogation associated with said interrogator with at least one calibration marker located about said person.

21. The method as recited in claim 17 further comprising exchanging data with an external server.

22. The method as recited in claim 17 further comprising providing a location of said first object and said second object with said control and processing subsystem.

* * * * *